(12) United States Patent
Korey et al.

(10) Patent No.: US 10,334,927 B2
(45) Date of Patent: Jul. 2, 2019

(54) LUGGAGE SYSTEM EMPLOYING A TELESCOPICALLY-EXTENDABLE HANDLE AND BATTERY POWER SUPPLY ASSEMBLY EQUIPPED WITH A SEMI-AUTOMATIC BATTERY POWER MODULE EJECTION MECHANISM

(71) Applicant: JRSK, Inc., New York, NY (US)

(72) Inventors: Stephanie Korey, New York, NY (US); Jennifer Rubio, New York, NY (US)

(73) Assignee: JRSK, Inc., New York, NY (US)

(*) Notice: Subject to any disclaimer, the term of this patent is extended or adjusted under 35 U.S.C. 154(b) by 0 days.

(21) Appl. No.: 15/902,825

(22) Filed: Feb. 22, 2018

(65) Prior Publication Data

US 2018/0255895 A1 Sep. 13, 2018

Related U.S. Application Data

(63) Continuation of application No. 15/684,077, filed on Aug. 23, 2017, which is a continuation-in-part of application No. 14/938,335, filed on Nov. 6, 2015.

(51) Int. Cl.
| | |
|---|---|
| *H02J 7/00* | (2006.01) |
| *A45C 13/28* | (2006.01) |
| *A45C 13/26* | (2006.01) |
| *A45C 5/03* | (2006.01) |
| *A45C 5/14* | (2006.01) |
| *A45C 13/10* | (2006.01) |
| *A45C 5/06* | (2006.01) |
| *A45C 13/02* | (2006.01) |
| *A45C 13/03* | (2006.01) |

(Continued)

(52) U.S. Cl.
CPC ............... *A45C 13/28* (2013.01); *A45C 5/03* (2013.01); *A45C 5/06* (2013.01); *A45C 5/14* (2013.01); *A45C 13/02* (2013.01); *A45C 13/03* (2013.01); *A45C 13/103* (2013.01); *A45C 13/1023* (2013.01); *A45C 13/18* (2013.01); *A45C 13/262* (2013.01); *A45C 15/00* (2013.01); *H02J 7/0045* (2013.01); *H02J 7/0052* (2013.01); *A45C 2005/037* (2013.01); *A45C 2013/025* (2013.01);
(Continued)

(58) Field of Classification Search
USPC ................................. 320/107, 129, 137, 152
See application file for complete search history.

(56) References Cited

U.S. PATENT DOCUMENTS

| 5,922,489 A * | 7/1999 | Adachi | ............... H01M 2/1044 429/100 |
|---|---|---|---|
| 2007/0029218 A1 | 2/2007 | Picot et al. | |

(Continued)

*Primary Examiner* — Brian Ngo
(74) *Attorney, Agent, or Firm* — Proskauer Rose LLP

(57) ABSTRACT

A luggage system employing a telescopically-extendable handle and rechargeable battery power supplying assembly. The assembly includes a pair of spaced-apart stationary guide tubes for supporting a pair of telescopically-extendable rods joined to a handle structure. A base housing component is mounted in an aperture formed in the rear housing portion, and has a top surface. A battery module casing is mounted to and beneath the base housing component, and disposed substantially in the same plane as and between the pair of spaced-apart guide tubes. A rechargeable DC battery power module is contained in the battery module casing, and provides a DC battery recharging port and a set of DC power supplying ports. A semi-automatic battery power module ejection mechanism is mounted within a battery module casing mounted beneath the telescopically-extendible handle and battery power supplying assembly.

16 Claims, 17 Drawing Sheets

(51) Int. Cl.
*A45C 13/18* (2006.01)
*A45C 15/00* (2006.01)

(52) U.S. Cl.
CPC . *A45C 2013/267* (2013.01); *H02J 2007/0062* (2013.01)

(56) References Cited

U.S. PATENT DOCUMENTS

| | | | | |
|---|---|---|---|---|
| 2009/0139814 A1* | 6/2009 | Grossman | ............ | A45C 7/0086 190/18 A |
| 2012/0111679 A1* | 5/2012 | Van Den Biggelaar | ...................... | A45C 5/14 190/8 |
| 2012/0161712 A1* | 6/2012 | Saito | .................... | H02J 7/0031 320/129 |
| 2013/0248309 A1* | 9/2013 | Lein | ......................... | A45C 5/00 190/9 |
| 2014/0076679 A1* | 3/2014 | Hughes | ................ | A45C 13/262 190/18 A |
| 2015/0027836 A1* | 1/2015 | Zhou | ........................ | A45C 9/00 190/12 A |
| 2015/0118534 A1* | 4/2015 | Rolfs | .................. | H01M 2/1044 429/99 |
| 2015/0290039 A1* | 10/2015 | McCulloch | ............. | A61F 9/029 2/439 |
| 2016/0153626 A1* | 6/2016 | Ozaka | ................... | H02J 7/0031 362/86 |
| 2016/0255928 A1* | 9/2016 | O'Donnell | ............... | A45C 5/03 |
| 2016/0255934 A1* | 9/2016 | Attebery | ................ | A45C 15/00 |
| 2016/0329537 A1* | 11/2016 | Foreman | ............. | H01M 2/1027 |

* cited by examiner

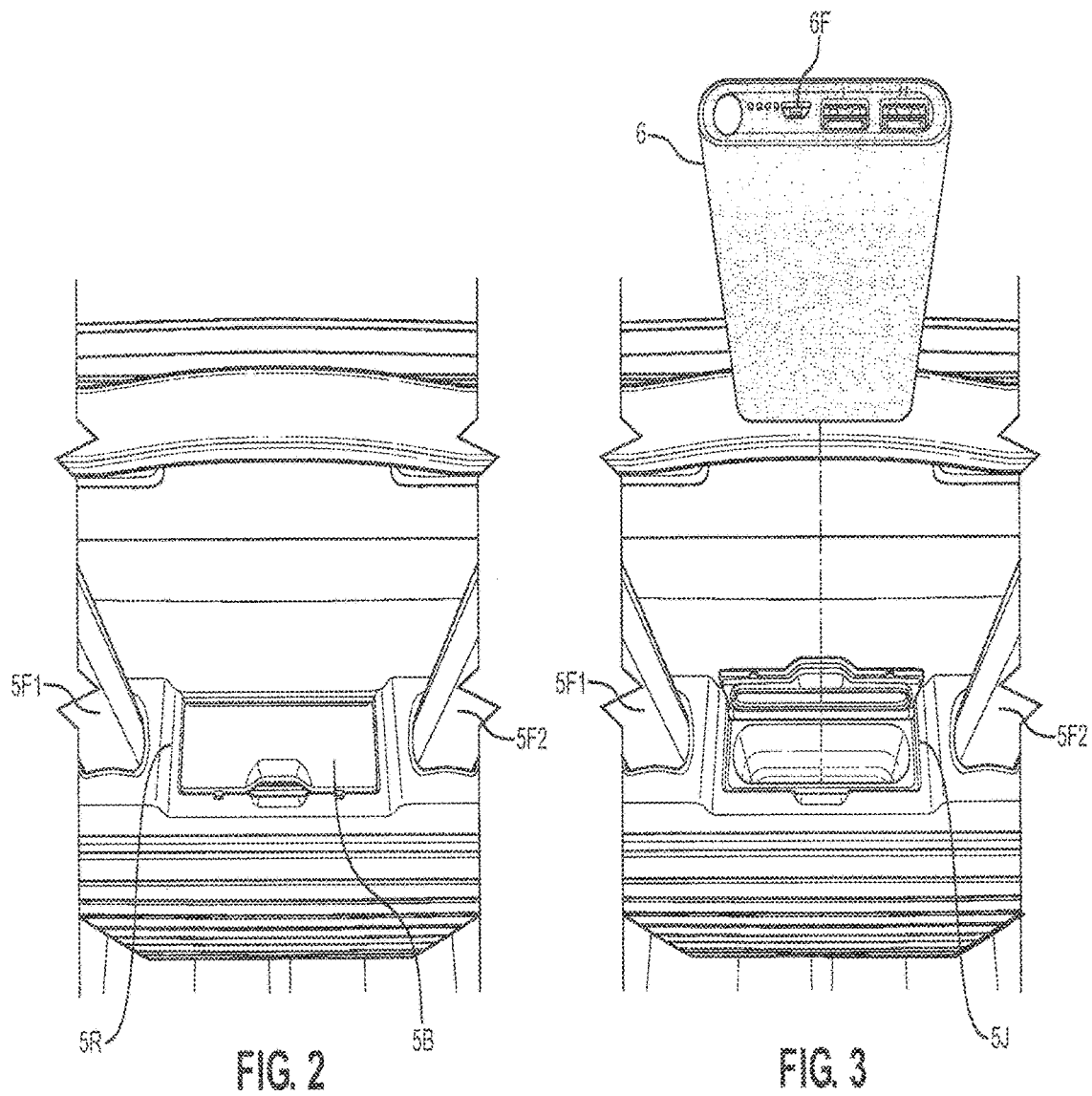

LUGGAGE SYSTEM EMPLOYING A TELESCOPICALLY-EXTENDABLE HANDLE AND BATTERY POWER SUPPLY ASSEMBLY EQUIPPED WITH A SEMI-AUTOMATIC BATTERY POWER MODULE EJECTION MECHANISM

RELATED CASES

This Application is a continuation of U.S. application Ser. No. 15/684,077, filed Aug. 23, 2017, entitled "Luggage System Employing a Telescopically-Extendable Handle and Battery Power Supply Assembly Equipped with a Semi-Automatic Battery Power Module Ejection Mechanism," which is a continuation-in-part of U.S. patent application Ser. No. 14/935,335, filed Nov. 6, 2015, entitled "Hard-Shell Luggage Systems." The contents of the above applications are hereby incorporated herein by reference in their entirety.

BACKGROUND OF INVENTION

Field of Invention

The present invention relates to new and improved hard-shell luggage systems for helping individuals transport personal items through airports, terminals, and other transportation systems, while overcoming the shortcomings and drawbacks associated with prior art technologies.

Brief Overview of the State of Knowledge and Skill in the Art

Luggage systems have evolved greatly over the past 100 years in step with developments in transportation systems (i.e. airports, terminals, bus stations and railways, and ocean liners), electronic communication and computing technologies, and evolving consumer behaviors and lifestyles. Consequently, particular groups of travelers have developed particular sets of expectations when it comes to particular classes of travel. At the same time, manufacturers of luggage systems have worked hard to ensure their evolving lines of luggage systems and related products will meet and satisfy these evolving expectations relating to utility, functionality, aesthetics as well as beauty.

While thousands of luggage systems have been designed, developed, manufactured and sold throughout the global marketplace over the past three decades, for both carry-on and check-in luggage systems alike, there still remains, however, a great need for new and improved luggage systems that address the new ways in which many people like to travel, in styles they feel most comfortable, and with unprecedented levels of convenience which they naturally welcome. Also, there is a great need for better rechargeable battery modules aboard modern luggage systems.

On Nov. 6, 2015, Applicant filed co-pending U.S. application Ser. No. 14/935,335 disclosing several improved hard-shell luggage system designs. Each of these luggage system designs employs an novel telescopically-extendible handle and battery power module assembly and provides its users with easily accessible USB-supplied DC electrical power accessible beneath its retractable/protractible handle structure for conveniently recharging mobile phones, iPads, laptop computers and other devices during travel.

While such USB-powered luggage systems have offered great value to consumers around the world, some practical problems have naturally arisen when using replaceable and rechargeable battery power modules in such luggage systems, especially when moving in a world constrained by airline restrictions, product liability concerns, and heightened safety and security situations. In particular, recent airline guidelines promulgated by the International Air Transport Association (IATA) (1st Edition, May 2017) "SMART BAGGAGE WITH INTEGRATED LITHIUM BATTERIES AND ELECTRONICS" require all lithium batteries to be removable and removed from their luggage pieces and carried into the cabin when traveling on an aircraft. To complicate things, the modern traveler is often forced to navigate through complex travel environments, often with one hand pulling the trolley handle of their luggage system, while one's other hand is holding a mobile phone, purse and/or briefcase.

In view, therefore, of these facts and circumstances of the global luggage system marketplace, there is a great need in the art for new and improved luggage systems that that better address the ways in which many people like to travel, in a style they feel most comfortable, while enjoying an unprecedented level of convenience which they will naturally welcome, while overcoming the shortcomings and drawback of prior art luggage systems, methods and technologies.

SUMMARY AND OBJECTS OF THE PRESENT INVENTION

Accordingly, a primary object of the present invention is to provide a new and improved luggage system that better addresses the ways in which many people like to travel, in a style they feel most comfortable, while enjoying an unprecedented level of convenience which they will naturally welcome, and overcoming the shortcomings and drawback of prior art luggage systems, methods and technologies.

Another object of the present invention is to provide such a new and improved luggage system, wherein the housing portions are hinged together to provide a housing assembly provided with a set of spinner wheels; a telescopically-extendable handle and rechargeable battery power supplying assembly is mounted within a housing portion and has a pair of spaced-apart telescopic-handle guide-tubes, supporting a pair of telescopically-extendable rods joined to a handle structure for pulling the luggage piece on its spinner wheels; and a semi-automatic battery power module ejection mechanism mounted within a battery module casing mounted immediately beneath the telescopically-extendible handle assembly, for semi-automatically ejecting the battery power module from the top surface opening in the battery module casing, when the finger of a user presses down on the battery power module while retained in the battery module casing, and the battery power module automatically pops-up above the surface of the power port access opening, for manual removable from the battery module casing by the user's fingers.

Another object of the present invention is to provide such a new and improved luggage system, wherein the telescopically-extendable handle and rechargeable battery power supplying assembly includes (i) a base housing component mounted in an aperture formed in the rear housing portion and having a top surface; (ii) a battery module casing mounted to and beneath the base housing component, and disposed substantially in the same plane as and between the pair of spaced-apart telescopic-handle guide tubes; (iii) a rechargeable DC battery power module contained in the battery module casing, and providing a DC battery recharging port and a set of DC power supplying ports, directly accessible through the top surface of the base housing component; and (iv) a power port cover panel hinged to the base housing component and having a closed configuration and an open configuration, wherein the power port cover panel conceals the DC power recharging port and the DC power supplying ports when the power port cover panel is arranged in the closed configuration, and wherein the power port cover panel reveals the DC power recharging port and the DC power supplying ports when the power port cover panel is arranged in the open configuration.

Another object of the present invention is to provide such a new and improved hard-shell luggage system comprising front and rear hard-shell housing portions hinged together and sealed using a zippering or other sealing mechanism, wherein a telescopic-handle and battery power supplying assembly is mounted in the rear hard-shell housing portion and having a base housing assembly supporting a rechargeable battery power module having USB-type DC power supplying/discharging and recharging ports protected beneath a hinged power port cover panel, and ejected from its battery module casing using a semi-automatic battery module ejection mechanism adapted to the bottom opening of the battery module casing.

Another object of the present invention is to provide such a new and improved luggage system that allows the user to pull (i.e. trolley) the luggage system around during travel, while talking on a mobile phone that is being recharged with the telescopic handle assembly protracted and a USB power plug cable connected between the mobile phone and a USB power port in the luggage system.

Another object of the present invention is to provide such a new and improved luggage system that has a USB power port cover panel that will automatically close down and seal off a set of USB power recharging and supplying ports from the environment, to minimize rain from seeping into the USB power ports of the luggage system during travel.

Another object of the present invention is to provide such a new and improved luggage system, wherein a semi-automatic battery power module ejection mechanism is provided at the bottom of a battery module casing, mounted within the telescopically-extendable handle housing base component, between the telescopic handle guide tubes, so as to enable single-finger battery module release operation.

Another object of the present invention is to provide such a new and improved luggage system, wherein a semi-automatic battery power module ejection mechanism is provided at the bottom of a battery module casing, mounted to an access opening in the telescopically-extendable handle housing base component, between a pair of telescoping-handle guide tubes, so as to enable single-finger press and pop-up type battery module release operation during travel.

Another object of the present invention is to provide such a new and improved hard-shell luggage system, wherein a manually-lockable latch is provided on a hinged power port cover panel, disposed over the power recharging and supplying/discharging ports of a rechargeable battery power module installed within the battery module casing mounted to the base housing component of a telescopically-extendible handle and battery module assembly installed in a hard-shell luggage system.

Another object of the present invention is to provide new and improved methods of operating a luggage piece using single-finger and single-handed operations, including improved methods of loading rechargeable battery power modules in luggage pieces; improved methods of accessing and using of battery power modules in luggage pieces; improved methods of retaining battery power modules in luggage pieces; improved methods of securing battery power modules in luggage pieces; and improved methods of using luggage pieces equipped with rechargeable/replaceable battery power modules during travel.

Another object of the present invention is to provide a new and improved method of operating a luggage piece using single-handed operations, wherein the fingers of the user's hand are used to (i) manually release and protract the telescopically-extendible handle and battery power supplying assembly from its base housing component installed in the luggage piece, (ii) slide or rotate its release latch/lock to unlock its hinged power port cover panel covering the USB power recharging and discharging ports of the battery power module loaded and retained in the battery module casing mounted beneath the telescopically-extendible handle and battery power supplying assembly, (iii) rotate upwardly the hinged power port cover panel to its open configuration, and (iv) plug a USB power cable into the USB power recharging port or USB power discharging/supplying port, as the case may be.

Another object of the present invention is to provide a new and improved method of loading rechargeable battery power module in a luggage piece using single-handed operations, wherein the fingers of the user's hand are used to (i) manually release and protract the telescopically-extendible handle and battery power supplying assembly from its base housing component installed in the luggage piece, (ii) slide or rotate its release latch/lock to unlock the hinged power port cover panel covering the battery module casing mounted beneath the telescopically-extendible handle and battery power supplying assembly, (iii) rotate upwardly the hinged power port cover panel, (iv) load a rechargeable a battery power module into the battery module casing, and then press downwardly on the rechargeable battery power module retained in the battery module casing until the battery power module automatically locks into position within the battery module casing beneath the power port access opening surface, and (v) rotate the hinged power port cover panel in a downwardly direction to close off the battery module casing from the environment.

Another object of the present invention is to provide a new and improved method of removing a rechargeable battery power module from a luggage piece using only single-handed operations, wherein the fingers of the user's hand are used to (i) manually release and protract the telescopically-extendible handle and battery power supplying assembly from its base housing component installed in the luggage piece, (ii) slide or rotate its release latch/lock to unlock the hinged power port cover panel covering the USB power recharging and discharging ports of a battery power module loaded and retained in the battery module casing mounted beneath the telescopically-extendible handle assembly, (iii) rotate upwardly the hinged power port cover panel to its open configuration, (iv) press downwardly the rechargeable battery power module retained the battery module casing, and allow the battery power module to automatically pop-up out of and extend beyond the battery module casing opening for easily removal using the fingers of the user, and after removal of the battery module, (v) rotate the hinged power port cover panel in a downwardly direction to close off the battery module casing from the environment.

Another object of the present invention is to provide a new and improved method of retaining a rechargeable battery power module in a luggage piece using only single-handed operations, wherein the fingers of the user's hand are used to (i) manually release and protract the telescopically-extendible handle and battery power supplying assembly from its base housing component installed in the luggage piece, (ii) slide or rotate its release latch/lock to unlock the hinged power port cover panel covering the battery module casing mounted beneath the telescopically-extendible handle and battery power supplying assembly, (iii) rotate upwardly the hinged power port cover panel to its open configuration, (iv) load a rechargeable a battery power module, having elastic retention projections on its bottom surface, into the battery module casing having a support platform with mated retention recesses that releasably receive the elastic retention projections and retain the battery power module within the battery module casing, (v) press downwardly on the rechargeable battery power module retained the battery module casing until the battery power module automatically locks into position within the battery module casing beneath the access opening surface, and (vi) rotate the hinged power port cover panel in its closed configuration.

These and other objects of the present invention will become apparent hereinafter and in view of the appended Claims to Invention.

BRIEF DESCRIPTION OF THE DRAWINGS

The Objects of the Present Invention will be more fully understood when read in conjunction with the Figure Drawings, wherein:

FIG. 2 is a partially cut-away perspective view of the hard-shell luggage system of FIG. 1, showing the front power access port for the rechargeable/replaceable battery power module, covered by its hinged battery port access cover panel arranged in its closed configuration;

FIG. 3 is a partially cut-away perspective view of the hard-shell luggage system of FIG. 1, showing the battery module casing having an empty inner cavity without a rechargeable/replaceable battery power module loaded therein, while the hinged battery port access cover panel is arranged in its open configuration;

DETAILED DESCRIPTION OF THE ILLUSTRATIVE EMBODIMENTS OF THE PRESENT INVENTION

Figure 1:
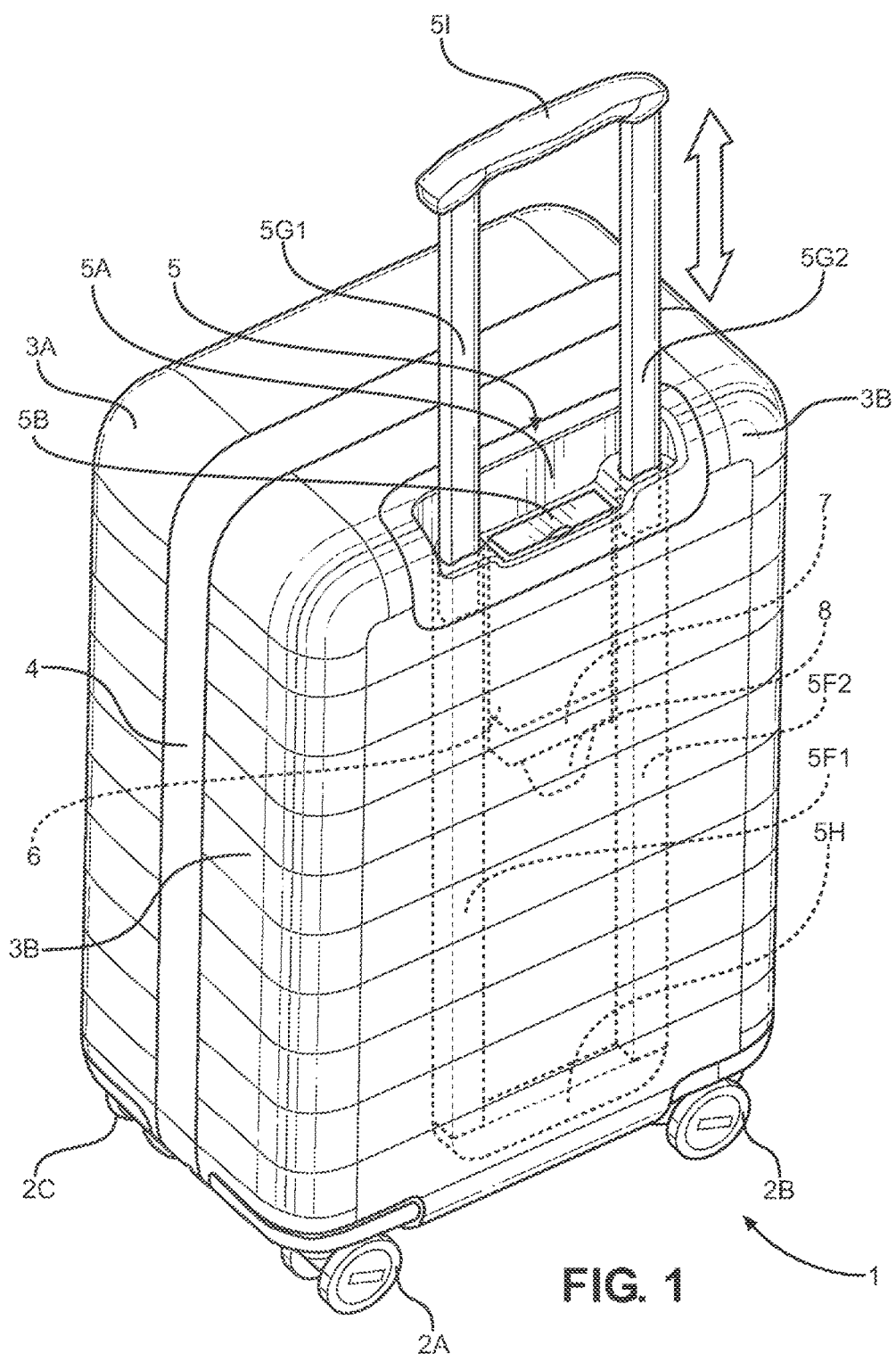
FIG. 1 is a front perspective view of a first illustrative embodiment of the hard-shell luggage system of the present invention, wherein the hard-shell luggage system is positioned on its set of four spinner wheels mounted in the four corners of the luggage system, wherein its front and rear hard-shell housing portions are arranged in a closed configuration and sealed using its integrated zipper mechanism, and wherein its telescopically-extendable handle and battery power supplying assembly is arranged in its protracted configuration over the hinged power port cover panel concealing its USB DC electrical power supplying ports, and DC power recharging port supported within the rechargeable/replaceable battery power module, releasably retained within a battery module casing having a semi-automatic (e.g. press and pop-up) battery module ejection mechanism mounted at the bottom end portion of the battery module casing.

Referring to the accompanying Drawings, like structures and elements shown throughout the figures thereof shall be indicated with like reference numerals.

Specification of the Luggage System of the First Illustrative Embodiment of the Present Invention Referring to FIGS. 1 through 8, the carry-on luggage system of the first illustrative embodiment of the present invention 1 will now be described in detail. The cross-sectional perspective views shown in FIGS. 9 through 15 correspond to the perspective views shown in FIGS. 2 through 8, respectively.

As shown in FIG. 1, the hard-shell luggage system 1 is positioned on its set of four spinner wheels 2A through 2D mounted in the four molded corners of the luggage shells 3A and 3B forming the hard-shell luggage system. Its front and rear hard-shell housing portions 3A and 3B are arranged in a closed configuration and sealed using its integrated zipper mechanism 4, although it is understood that other sealing systems can be used, for example, hard-hinges, latches and other fasteners. As shown, its telescopically-extendable handle and battery power assembly 5 of the present invention has a base housing component 5A, made from molded hard plastic material, and installed in the aperture formed in rear housing shell 3B. In the preferred embodiment, the physical dimensions of the carry-on luggage system are about 22×14×9 inches which is the maximum carry-on size allowed for all major US-based carriers including Delta, United, and American Airlines. In alternative illustrative embodiments of the present invention, these luggage piece dimensions may vary to meet the application at hand. Technical details on the hard-shell luggage system 1 can be found in co-pending U.S. patent application Ser. No. 14/935, 335 filed Nov. 6, 2015, which is incorporated herein by reference in its entirety.

As shown in FIG. 1, the telescopically-extendible handle and battery power supplying assembly 5 is arranged in its protracted configuration over the hinged power port cover panel 5B concealing and protecting a number of electrical components: (i) USB-type DC electrical power supplying/discharging ports 6A and 6B; (ii) micro-USB-type DC power recharging port 6C; (iii) LED-based power state indicating lights 6D; and (iv) manually-operated power-level "press-to-test" battery level button 6E. Each of these components is supported within the top surface panel of the rechargeable/replaceable battery power module 6, as shown in FIGS. 4, 5, 6 and 7. As shown in FIG. 1, the rechargeable/replaceable battery power module 6 is releasably and slidably retained within the hollow central cavity of the battery module casing 7. As shown in FIGS. 1, and 9 through 15, the battery module casing 7 is securely fastened to the bottom of the base housing component 5A, immediately beneath the rectangular power port access opening 5J formed in the top surface 5K of the base housing component 5K. As shown in FIGS. 1 and 9 through 15, the battery module casing 7 is provided with a semi-automatic (spring-powered) battery module ejection mechanism 8 mounted at the open bottom end portion of the battery module casing 7 by a set of screws. Various kinds of electro-chemical cells can be used to construct the rechargeable/replaceable battery power module 6 of the present invention, including, but not limited to solid-state lithium-ion, solid-state sodium-ion, aluminum-air, zinc-air, and other battery technology known in the art.

In the protracted configuration, shown in FIGS. 1 and 5, 6 and 18, the hinged power port cover panel 5B is shown arranged in its open configuration providing access to the USB DC electrical power supplying/discharging ports 6A, 6B, through the aperture formed by the rectangular power port access opening 5J. In this configuration, the user can pull (i.e. trolley) the luggage system during travel while holding the mobile smartphone. In the event that the user is pulling the luggage system along a rainy surface (e.g. while talking on a mobile phone that is being recharged), the spring-biased power port cover panel 5B will automatically close down on any USB power plugs installed in USB power ports 6A and 6B, and operate to prevent rain from seeping into the USB power ports of the luggage system and prevent electrical shock or shorting. Further, by being nestled within the confines of the walls surfaces 5A and 5C of the well-shaped geometry of the base housing component 5A, and beneath the hinged protected power port cover panel 5B, provides the USB-type power supplying ports 6A and 6B and micro-USB-type power recharging port 6C with added shelter from the natural elements when traveling during rain, snow and/or dust storms.

As shown in FIG. 1, the telescopically-extendible handle and battery power supplying assembly 5 is arranged in its protracted configuration with the hinged power port cover panel 5B arranged in its closed configuration to conceal both its USB-type DC electrical power supplying/discharging ports 6A and 6B and micro-USB-type DC power recharging port 6C. To recharge the onboard rechargeable DC battery module 6, an AC/DC power adapter (not shown) would be plugged into a standard 120V wall supply, and a USB cable (now shown) is connected between the DC recharging port 6C and the AC/DC power adapter 25. As the battery recharges, the LED-based battery level indicator lights 6D will illuminate to indicate when a fully battery recharge has been achieved.

Referring to FIGS. 1, and 9 through 15, the manually-releasable handle portion 5I contains an internal manual lock and release mechanism (not-shown) installed within the elongated handle structure 5I, which is triggered by manually-depressing a manually-depressible button located centrally on the underside surface of the handle structure 5I. Any suitable lock and release mechanism can be used to practice the present invention, and is generally known in the telescoping-handle and luggage system arts.

As shown, the telescopically-extendable handle and battery power supplying assembly 5 comprises a base housing component 5A having a set of spaced apart guide tubes 5F1, 5F2, into which a set of telescoping rod members 5G1, 5G2 pass and connect on one end to mounting apertures formed in the handle portion 5I, and on the other end to mounting apertures formed in a telescopic rod member mounting bracket 5H having a foot portion 5H. As shown, the foot portion 5H mounts to the bottom surface of the rear hard-shell housing portion 3B of the luggage system using glue or other suitable adhesive.

Preferably, base housing component 5A, guide tubes 5F1 and 5F2, and the telescopic member mounting bracket 5H are molded from plastic material. Preferably, telescopic rods 5G1 and 5G2 are made from metal, carbon fiber or plastic materials exhibiting strength and resilience required by the application at hand where the user needs to pull (i.e. trolley) along the luggage system along sidewalks, up stairwells, and other pathways aboard airplanes, trains, ocean liners and other travel vessels.

Figure 9:
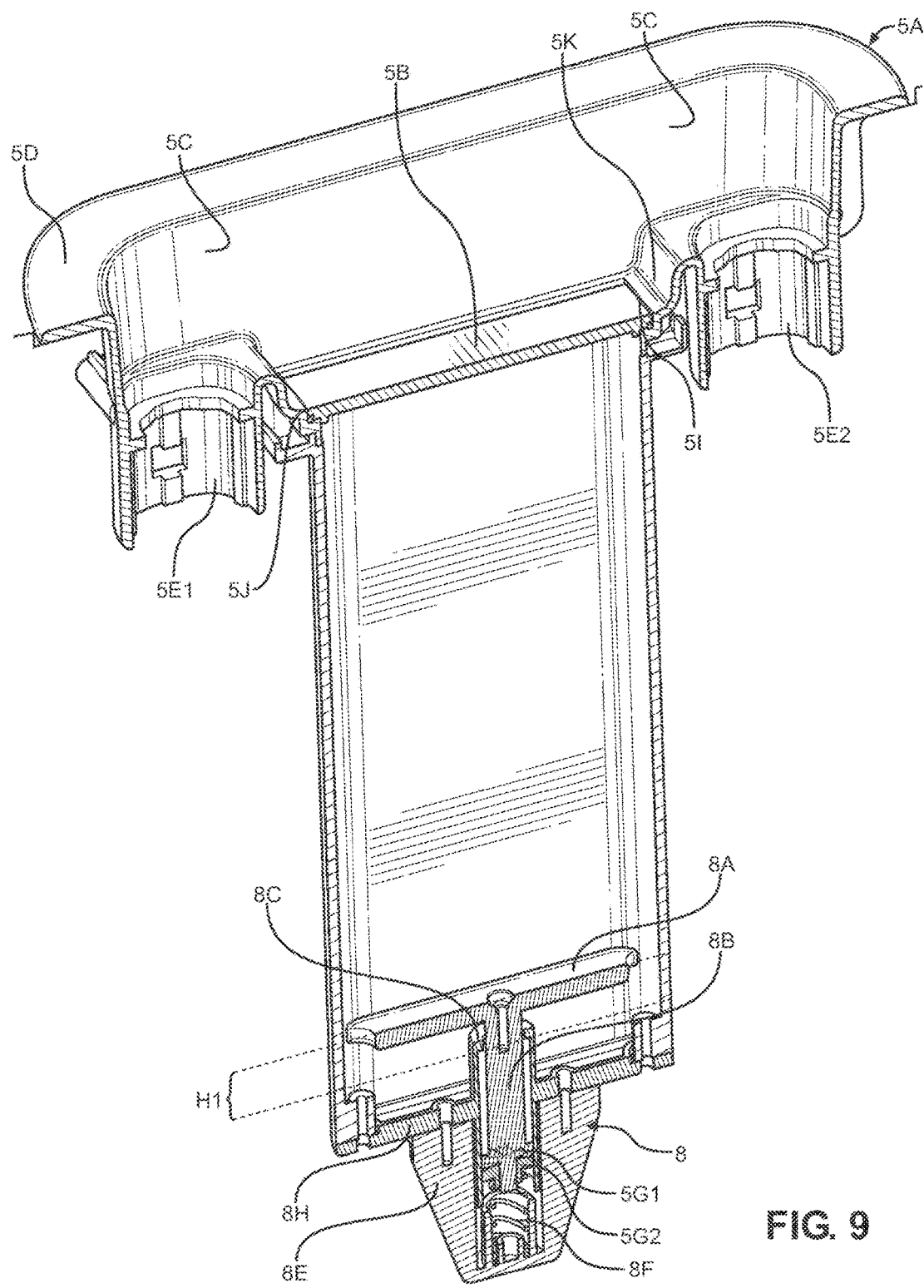
FIG. 9 is a perspective, partially cut-away and cross-sectional view of the telescopically-extendible handle and battery power supplying assembly of the present invention installed in the hard-shell luggage system of FIG. 1, corresponding to the luggage system and battery power module configuration shown in FIG. 2, revealing (i) the base housing component with its hinged power port cover panel arranged in its closed configuration covering and closing the front rectangular power port access opening, (ii) the pair of stationary handle-rod guide tubes removed for illustration purposes, (iii) the battery module casing mounted to the base housing component so that the interior of the battery module casing is accessible through the front rectangular port power access opening, (iv) the spring-powered battery module ejection mechanism mounted to the bottom of the battery module casing, and (v) the replaceable battery power module shown removed from the cavity portion of the battery module casing at this state of operation.

As shown in FIG. 1, the base housing component 5A further comprises: a top surface 5K, with a recessed well section in its middle region, having a front power port access opening 5J; side wall portions 5C extending vertically from the top surface 5K; a top flange region 5D extending off the perimeter edges of the side wall surfaces 5C; and hinged power port cover panel 5B that has a lip portion 5B2 and soft rubber seals 5B2 on its underside to create a water seal with a corresponding groove formed in and about the inner perimeter of the power port access opening 5J, thereby plugging up and sealing off the power ports 6A, 6B and 6C from sources of water (e.g. pools, puddles, rain showers, snow falls, and other elements) when the hinged power port cover panel 5B is arranged in its closed configuration as shown in FIGS. 1, 2 and 9.

As shown in FIG. 1, battery module casing 7 has an inner cavity 7A with an interior volume for receiving the battery power module 6. The battery module casing 7 is fastened to the bottom of the base housing component 5, beneath the front power port access opening 5J, by a pair of screws or other suitable fasteners. As shown in FIGS. 3, 4, 11 and 12, the battery module casing 7 is adapted to slidably receive the replaceable/rechargeable DC battery power module 6 for storage within the casing cavity 7A. The exterior dimensions of the battery power module 6 are slightly smaller than the interior dimensions of the cavity of the battery module casing 7, to allow easy receipt of the module 6 within the casing 7, but to avoid jiggling or shaking of the battery module 7 within the casing 7. In the preferred embodiment, the battery module casing 7 has a plurality of air apertures formed on both major side surfaces of the casing 7 to promote thermal heat transfer exchange between the battery power module 7 and the ambient environment during battery power discharging operations when heat energy is released during electro-chemical reduction operations within the battery power module 6.

As shown in FIG. 1, the battery module casing 7, with its battery power module 6 slidably retained therein, are supported within the plane of and between the pair of spaced-apart stationary handle-rod guide tubes 5F1 and 5F2, disposed immediately beneath the base housing component 5A. So arranged, this configuration provides the user with easy access to the DC power ports 6A, 6B and 6C, through the power port access opening 5J formed in top surface 5K, when hinged power port cover panel 5B is arranged in its open configuration, as shown in FIGS. 3 through 8. As shown, the power port cover panel 5B is hinged to the base housing component 5A (i.e. rotates about an axis of rotation that extends between the stationary guide tubes 5F1 and 5F2) and covers the DC power supplying/discharging ports 6A and 6B and DC power recharging port 6C, when the power port cover panel 5B is arranged in its closed configuration, as shown in FIGS. 1, 2, 9, and 13.

In the illustrative embodiments described herein, it is preferred that the hinged power port cover panel (or lid) 5B is spring-biased. In the context of the present invention, the term "spring-biased" shall mean that the hinged panel 5B is configured or otherwise biased in some way to automatically return or move to (i) a first predetermined closed position if and when the hinged panel 5B is rotated to a first particular range of angular positions, or (ii) a second predetermined open position if and when the hinged panel 5B is rotated to a second particular range of angular positions. In this way, it is possible to achieve both a snapped-shut panel operation, as well as a snapped open panel operation, by simply applying a slight rotation of the hinged panel 5B, as desired, with the simple flick of the user's finger. The use of the term "spring-biased" hinged panel shall not be intended to mean that literally, a mechanical spring (made of metal or plastic) is or must be used in the implementation of the hinged power port cover panel 5B and its associated assembly. Indeed, a mechanical spring might be used to construct the spring-biased hinged power port cover panel 5B. However, alternatively, one or more molded plastic projections, stemming from the panel 5B, may engage with the base housing component, around the perimeter access opening 5J region, so as to set up and achieve the desired biasing forces so that the hinged panel 5B opens and closes as desired, in an automated manner, in accordance with the spirit of the present invention. In other alternative embodiments, spring-biasing may not used at all to implement the hinged power port cover panel of the present invention.

Also, in the illustrative embodiments, it is preferred that the battery module locking latches (e.g. latches 40, 50 and 60 shown in FIGS. 19A through 21B) are spring-biased as well. In the context of the present invention, the term "spring-biased" shall mean that the battery module locking latch is also configured or otherwise biased in some way to automatically return or move to either (i) a first predetermined closed and locking position when the latch is flipped or turned one way with one's finger(s), or (ii) a second predetermined open and unlocked position when the latch is flipped or turned another way with one's finger(s). In this way, it is possible to realize an automatic or semi-automatic battery module locking/latching mechanism, which can be released and unlocked by simply applying a slight simple flick of the user's finger, or rotation of a knob with the user's fingers, as the case may be. The use of the term "spring-biased" battery module locking latch, and variations thereof, shall not be intended to mean that literally, a mechanical spring (made of metal or plastic) is or must be used in the implementation of the latch mechanism and its associated assembly. Indeed, a mechanical spring might be used to construct a spring-biased battery module locking/latching mechanism integrated with the hinged power port cover panel 5B. However, alternatively, one or more molded plastic projections, stemming from the latch, may engage with the base housing component or surrounding elements, so as to set up and achieve the desired biasing forces that cause the battery module locking mechanism to automatically lock as desired in accordance with the spirit of the present invention. In other alternative embodiments, spring-biasing may not used at all to implement the battery module locking/latching mechanism of the present invention.

In the illustrative embodiment, the two USB DC power supplying/discharging ports 6A and 6B are capable of charging two DC-powered devices simultaneously, whereas the one micro-USB power recharging port 6C enables the charging of the rechargeable battery power module 6 using a single USB-based AC/DC power adapter. Typically, using a 10,000 mAh battery, the battery power module 6 will be capable of fully charging an iPhone, or like mobile device, up to five or more times from a single 10,000 mAh battery charge. With future advances in battery technology, such battery performance characteristics are expected to improve.

Preferably, the power port cover panel 5B is spring-biased to automatically close down upon USB plug connectors inserted into the power ports 6A, 6B and 6C during discharging/supplying and/or recharging operations, to reduce exposure of the USB ports to the elements. However, in other embodiment, the power port cover panel 5B may be realized without the use of the spring biasing. Also, it is desired that the USB power ports 6A and 6B are recessed within the base housing component 5A so that when USB power plugs are inserted into USB power supplying/discharging ports 6A and 6B, the hinged power port cover panel 5B can be configured in a partially-closed configuration while cables associated with charging and/or recharging operations can pass through a small channel formed in the lip portion 5B1 in the power port cover panel 5B, to prevent water (e.g. rain, snow, pool water, and other elements) from entering open USB power ports while the luggage system is being transported through environments where exposure to rain and snow is inevitable.

As shown in FIGS. 1 and 9 through 15, the semi-automatic battery module ejection mechanism 8 is mounted at the bottom of the battery module casing 7 for semi-automatically ejecting the battery power module 6 from within the cavity of the battery module casing 7 upon the user manually pressing down on the top surface panel of the battery power module 6, made accessible through the power port access opening 5J, when the power port cover panel 5B is arranged in its open configuration as shown in FIGS. 3 through 8.

As shown in FIGS. 1, and 9 through 15, the semi-automatic battery module ejection mechanism 8 is realized as a compact module 8 that is connected to the bottom of the battery module casing 7. In the illustrative embodiment, the compact module 8 comprises an subassembly of components, namely: a module base housing 8E connected to a mounting plate 8H, which is fastened to the open bottom end portion of the battery module casing 7 by a pair of fastening screws, and having a support cylinder 8C; a support platform or plate 8A, connected to a support post 8B that is supported within the support cylinder 8C; a pair of configuration-state locking elements 8G1 and 8G2, operably connected to the bottom of support post 8B, and allowed to rotate and translate relative to each other with each downward movement of the support post 8B, and engaging and biased by a compressible spring element 8F supported at the bottom of the bore 8D. The pair of configuration-state-locking elements 8G1 and 8G2 can be realized in various ways, but in general, will perform the similar functions as the found in prior art retractable/protractible pens, and like devices, using springs and axially pushed cylinders as disclosed and taught in expired U.S. Pat. No. 3,819,282 to Schultz, incorporated herein by reference in its entirety.

As illustrated in FIGS. 9 through 15, semi-automatic battery module ejection mechanism 8 has three sequentially lockable states of configuration and operation. In each such state of configuration, the support platform 8A supports the bottom end portion of the rechargeable battery power module 6 loaded within the battery module casing 7, at different longitudinal position along the axis of the battery module casing 7 at a different state of configuration. A quick review of these three different states of configuration will be appropriate at this juncture.

Figure 10:
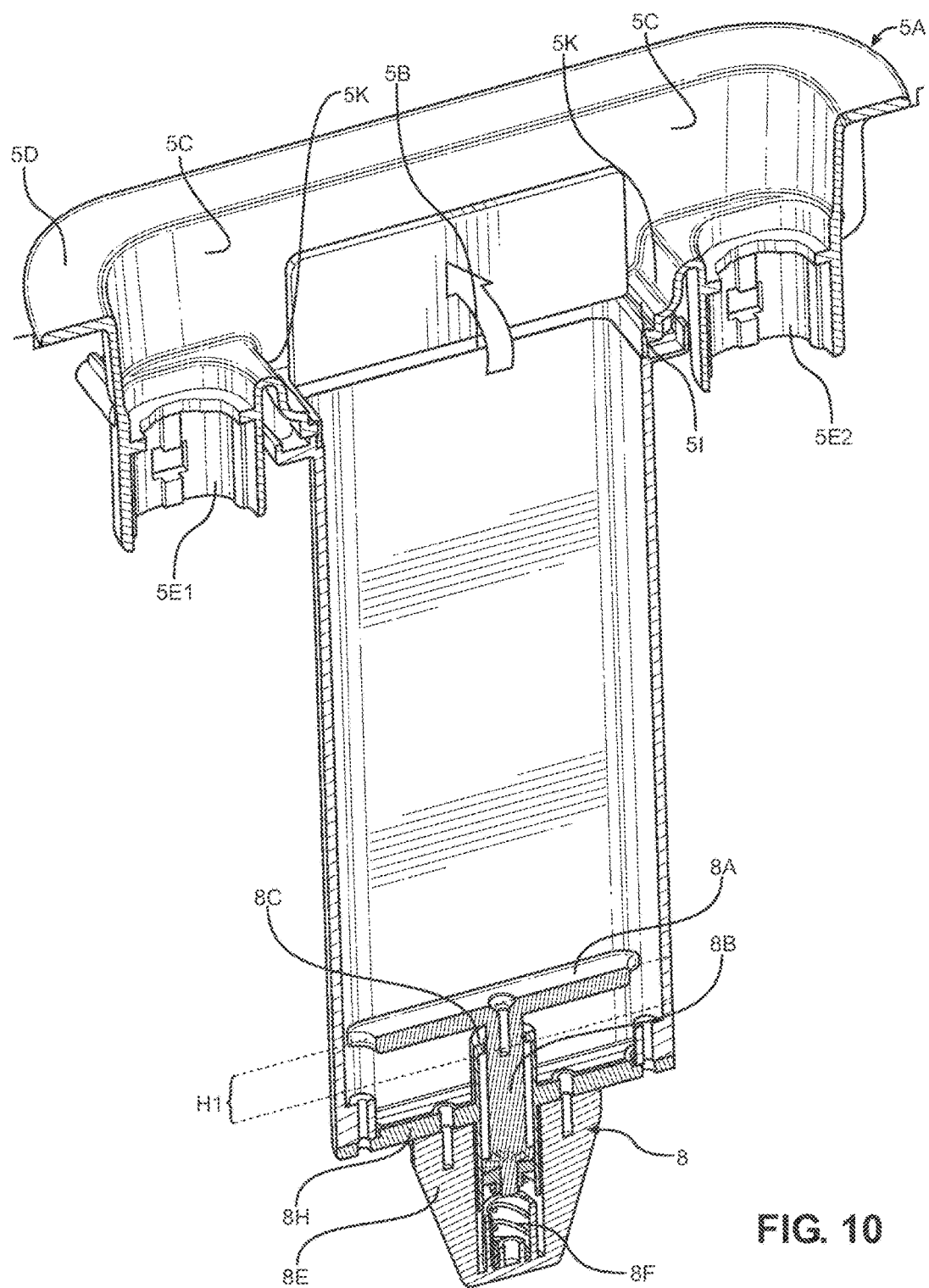
FIG. 10 is a perspective, partially cut-away and cross-sectional view of the telescopically-extendible handle and battery power supplying assembly of the present invention installed in the hard-shell luggage system of FIG. 1, corresponding to the luggage system and battery power module configuration shown in FIG. 3, revealing (i) the base housing component with its hinged power port cover panel arranged in its open configuration providing access to the front rectangular port power access opening, (ii) the pair of stationary handle-rod guide tubes shown removed for illustration purposes, (iii) the battery module casing mounted to the base housing component so that the interior of the battery module casing is accessible through the front rectangular power port access opening, (iv) the semi-automatic spring-powered battery module ejection mechanism mounted to the bottom of the battery module casing, and (i) the replaceable battery power module shown removed from the cavity portion of the battery module casing at this state of operation.
Figure 11:
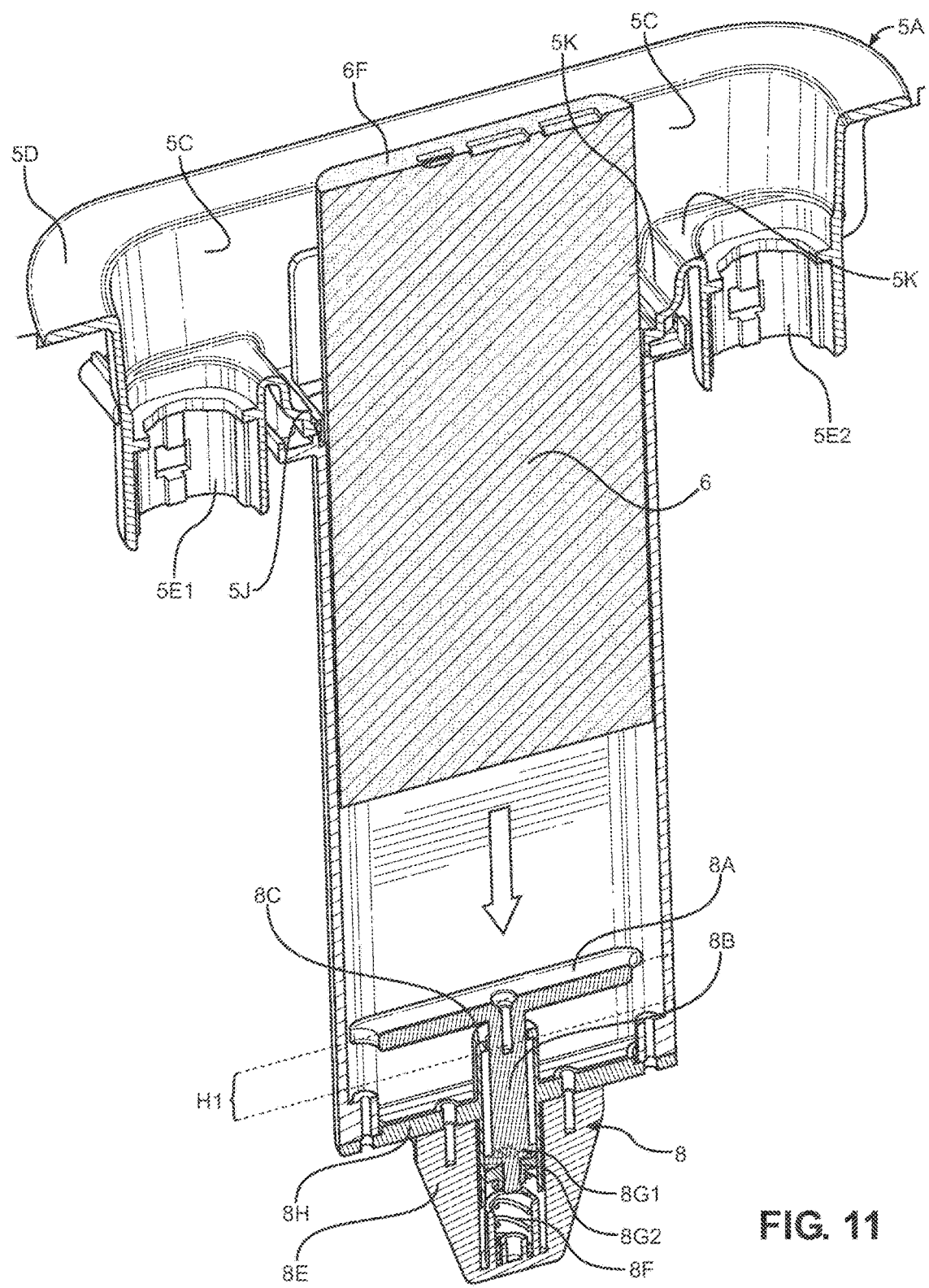
FIG. 11 is a perspective, partially cut-away and cross-sectional view of the telescopically-extendible handle and battery power supplying assembly of the present invention installed in the hard-shell luggage system of FIG. 1, corresponding to the luggage system and battery power module configuration shown in FIG. 4, revealing (i) the base housing component with its hinged power port cover panel arranged in its open configuration providing access to the front rectangular power port access opening, (ii) the pair of stationary handle-rod guide tubes shown removed for illustration purposes, (iii) the battery module casing mounted to the base housing component so that the interior of the battery module casing is accessible through the front rectangular power port access opening, (iv) the semi-automatic spring-powered battery module ejection mechanism mounted to the bottom of the battery module casing, and (i) the replaceable battery power module being slidably loaded within from the cavity portion of the battery module casing.

The first state of configuration is achieved when post 8B is manually pushed along the support cylinder 8C so that the battery support platform 8A is moved to a position H1 by an uncompressed/expanded spring element 8F as shown in FIG. 10. This allows a battery power module 6 to be loaded within the cavity of the battery module casing 7 as shown in FIG. 11.

Figure 12:
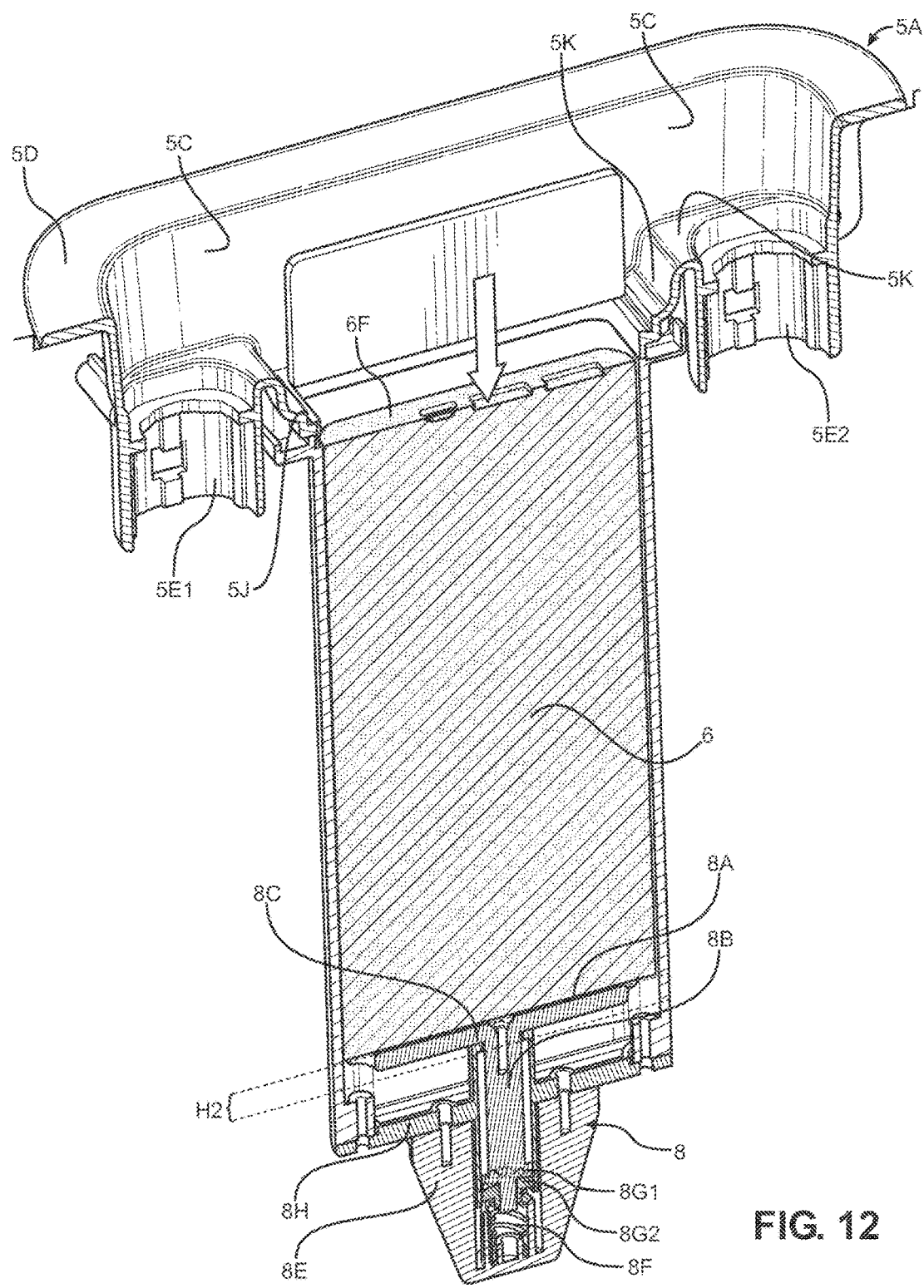
FIG. 12 is a perspective, partially cut-away and cross-sectional view of the telescopically-extendible handle and battery power supplying assembly installed in the hard-shell luggage system of FIG. 1, corresponding to the luggage system and battery power module configuration shown in FIG. 5, revealing (i) the base housing component with its spring-biased power port cover panel arranged in its open configuration providing access to the front rectangular power port access opening, (ii) the pair of stationary handle-rod guide tubes removed for illustration purposes, (iii) the battery module casing mounted to the base housing component so that the interior of the battery module casing is accessible through the front rectangular access port, (iv) the semi-automatic spring-powered battery module ejection mechanism mounted to the bottom of the battery module casing, and (i) the replaceable battery power module fully loaded within the cavity portion of the battery module casing.
Figure 13:
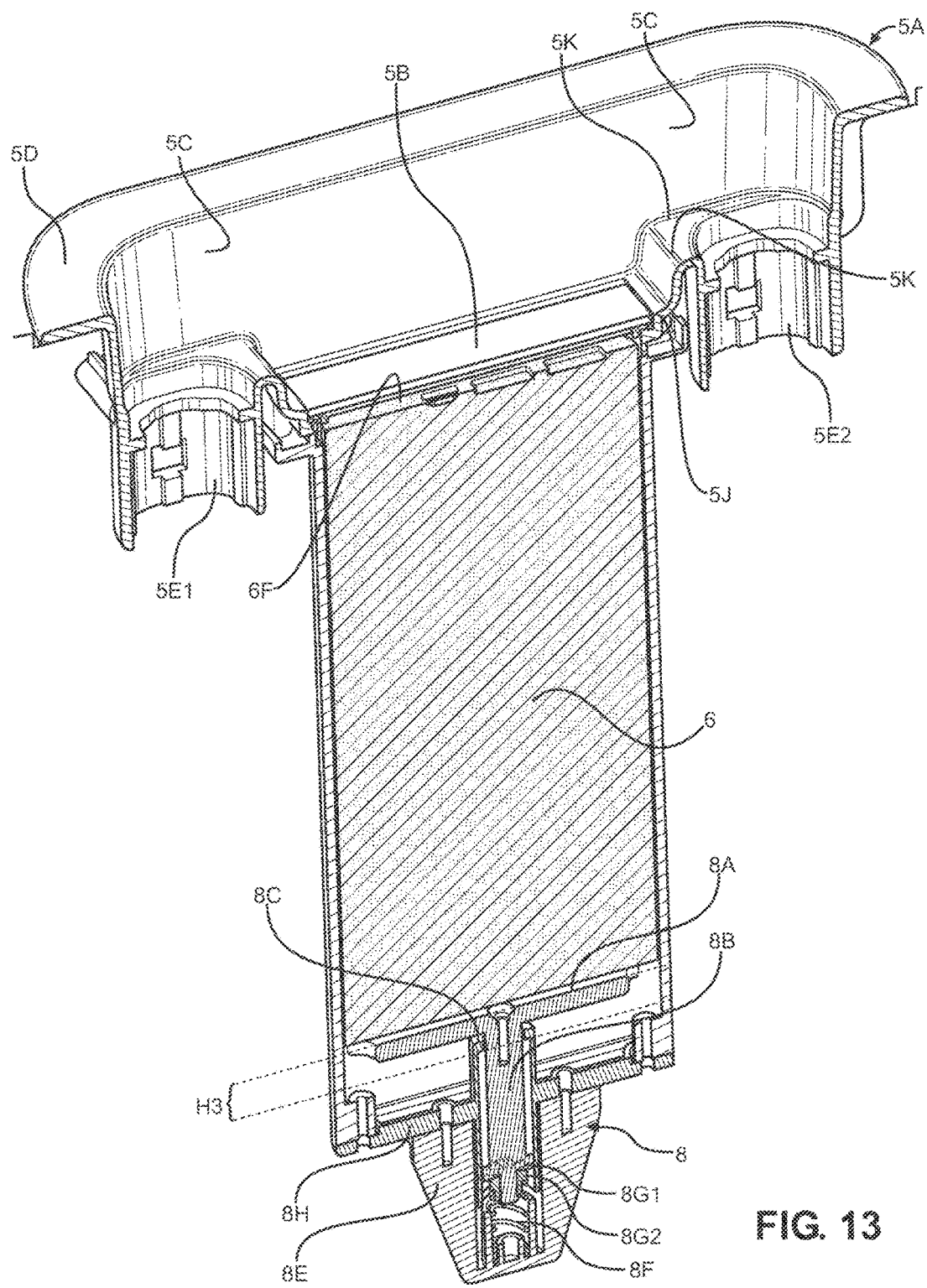
FIG. 13 is a perspective, partially cut-away and cross-sectional view of the telescopically-extendible handle and battery power supplying assembly installed in the hard-shell luggage system of FIG. 1, corresponding to the luggage system and battery power module configuration shown in FIG. 6, revealing (i) the base housing component with its hinged power port cover panel arranged in its open configuration providing access to the front rectangular power port access opening, (ii) the pair of stationary handle-rod guide tubes removed for illustration purposes, (iii) the battery module casing mounted to the base housing component so that the interior of the battery power casing is accessible through the front rectangular power port access opening, (iv) the semi-automatic spring-powered battery module ejection mechanism mounted to the bottom of the battery module casing, and (i) the replaceable battery power module fully loaded within the cavity portion of the battery module casing.

The second state of configuration is achieved when post 8B is manually pushed along the support cylinder 8C against the compressional forces generated by the spring element 8F as shown in FIG. 12. This arranges the spring in a compressed state and allows for the configuration-state locking elements 8G1 and 8G2 to configure and lock the battery support plate 8A at position H3, as shown in FIG. 13 where the top surface of the battery power module 6 resides within power port access opening 5J.

Figure 14:
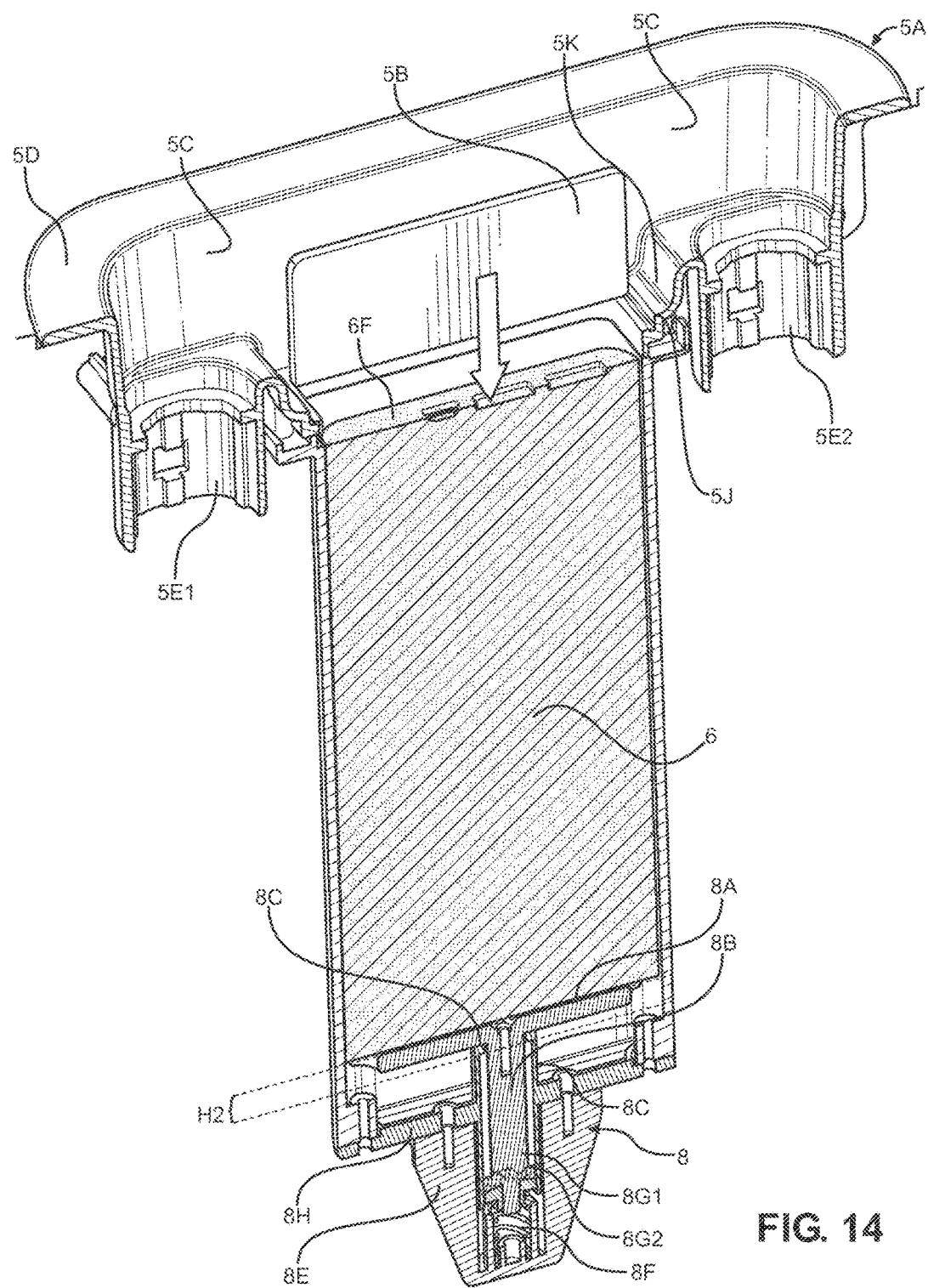
FIG. 14 is a perspective, partially cut-away and cross-sectional view of the telescopically-extendible handle and battery power supplying assembly installed in the hard-shell luggage system of FIG. 1, corresponding to the luggage system and battery power module configuration shown in FIG. 7, revealing (i) the base housing component with its hinged power port cover panel arranged in its open configuration providing access to the front rectangular power port access opening, (ii) the pair of stationary handle-rod guide tubes shown removed for illustration purposes, (iii) the battery module casing mounted to the base housing component so that the interior of the casing is accessible through the front rectangular power port access opening, (iv) the semi-automatic spring-powered battery module ejection mechanism mounted to the bottom of the battery module casing, and (i) the replaceable battery power module fully loaded within the cavity portion of the battery module casing, and being pressed downwardly to initiate the semi-automatic battery module ejection mechanism mounted at the bottom end of the battery module casing.
Figure 15:
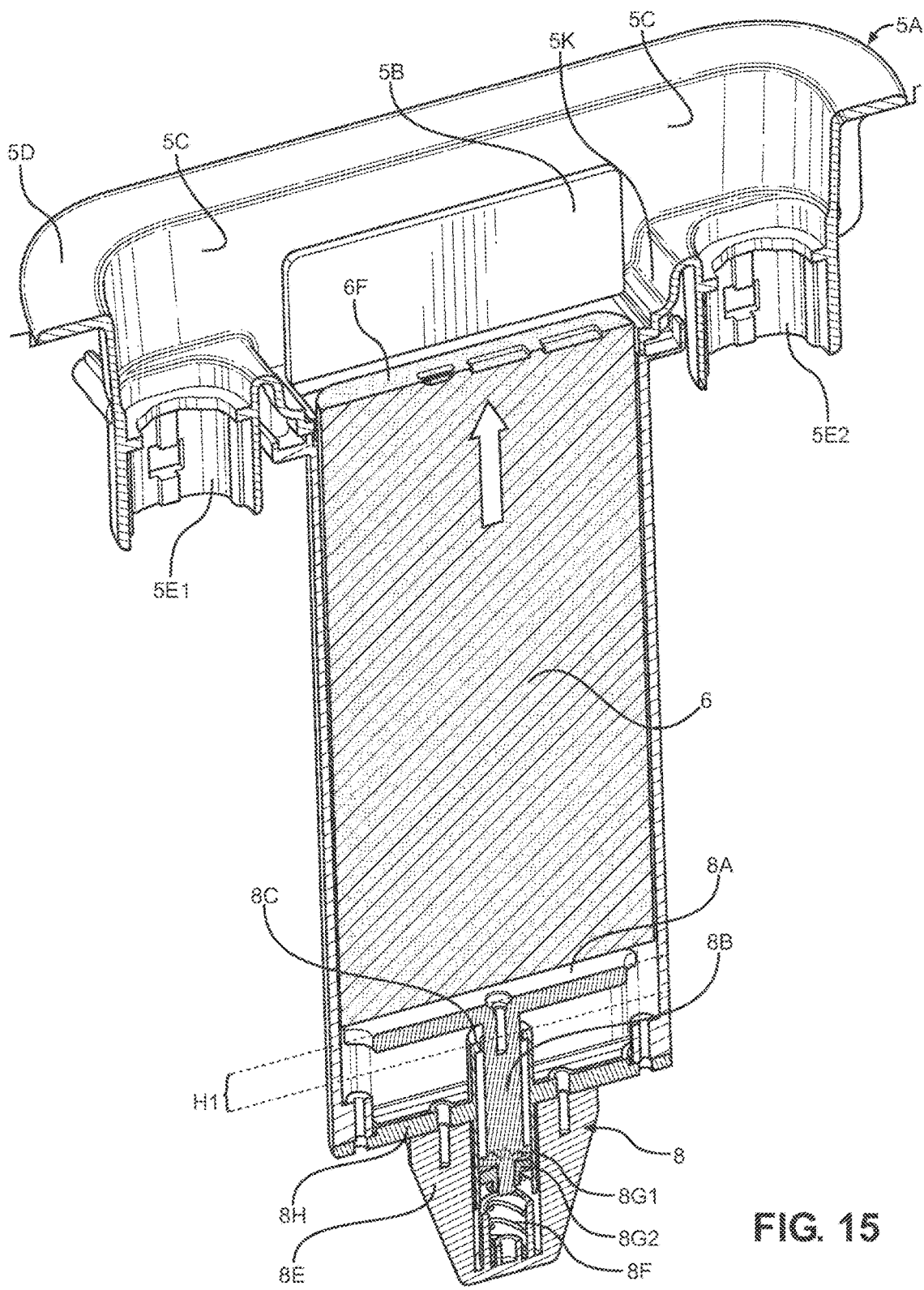
FIG. 15 is a perspective, partially cut-away and cross-sectional view of the telescopically-extendible handle and battery power supplying assembly installed in the hard-shell luggage system of FIG. 1, corresponding to the luggage system and battery power module configuration shown in FIG. 8, revealing (i) the base housing component with its hinged power port cover panel arranged in its open configuration providing access to the front rectangular power port access opening, (ii) the pair of stationary handle-rod guide tubes removed for illustration purposes, (iii) the battery module casing mounted to the base housing component so that the interior of the battery module casing is accessible through the front rectangular power port access opening, (iv) the semi-automatic spring-powered battery module ejection mechanism mounted to the bottom of the battery module casing, and (i) the replaceable battery power module removed from the cavity portion of the battery module casing, to allow manual removal of the popped-up battery power module from the casing using the fingers of the user.
Figure 16:
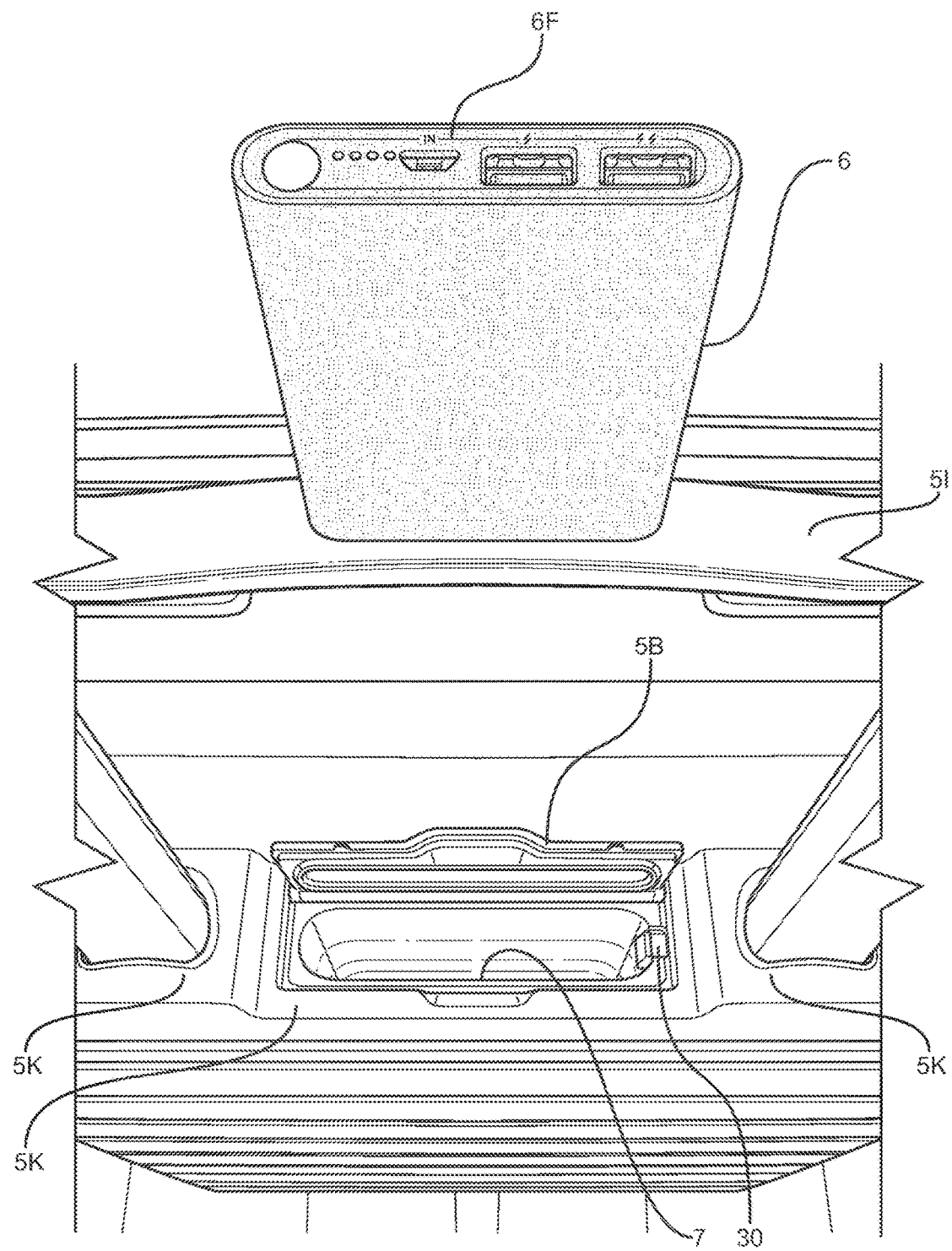
FIG. 16 is a perspective, partially cut-away and cross-sectional view of the telescopically-extendible handle and battery power supplying assembly installed in the hard-shell luggage system of FIG. 1, corresponding to the luggage system and battery power module configuration shown in FIG. 10, revealing (i) the pair of telescopically-extended tubes shown projecting from the stationary tubes, (ii) the base housing component having its hinged power port cover panel arranged in its open configuration, with its battery power module being removed from the cavity of the battery module casing, and (iii) a spring-biased battery module locking latch mechanism, mounted about the edge of the front rectangular access port of the battery module casing, being arranged in its un-locked configuration allowing the battery power module to slide out from its battery power casing for manual removal using the fingers of the user.

The third state of configuration is achieved when the post 8B is manually pushed along the support cylinder 8C against the compressional forces generated by the spring 8F for a second consecutive time. This time, the support plate 8A reaches height H2, as shown in FIG. 14, and the configuration-state locking elements 8F1 and 8F2 reconfigure and lock the support plate 8A at higher ejection position H3, as shown in FIG. 15 so that the top surface of the battery power module 6 resides above within power port access opening 5J. In this state, the ejected battery power module 6 can be manually removed by the fingers of the user, as shown in FIG. 16.

By virtue of the semi-automatic battery module ejection mechanism of the present invention, the battery power module 6 can be loaded within the battery module casing 7 and by manually pressing down on the battery power port panel 6F, the user can sequentially advance and achieve these three states of configuration and respective operation, as illustrated in FIGS. 12, 14 and 15.

In FIG. 11, the arrow indicates the direction of forces applied to the battery power module 6 by the user's finger(s), against the compressed spring 5F during the first state of configuration and operation of the semi-automated battery module ejection mechanism 8. Upon reconfiguration of the configuration-state locking mechanism 5G1 and 5G2, the arrow indicates the direction of forces on the battery module 6 generated by the compressed spring 5F, and the top surface of the battery module casing 7 is maintained slightly above the plane of the power port access opening 5J in a locked state of configuration illustrated in FIG. 12.

In FIG. 12, the arrow indicates the direction of forces applied to the battery power module 6 by the user's finger(s), against the compressed spring 5F, once again, but this time during the second state of configuration and operation of the semi-automated batter module ejection mechanism 8. Upon reconfiguration of the configuration-state locking mechanism 5G1 and 5G2, the top surface of the battery module casing 7 is maintained flush with the power port access opening 5J, in a locked state of configuration illustrated in FIG. 13.

In FIG. 14, the arrow indicates the direction of forces applied to the battery power module 6 by the user's finger(s), against the compressed spring 5F, during the third state of configuration and operation of the semi-automated batter module ejection mechanism 8. Upon reconfiguration of the configuration-state locking mechanism 5G1 and 5G2, once again, the arrow indicates the direction of forces on the battery power module 6 generated by the uncompressed spring 5F. As shown, the forces push the battery power module 6 out of the battery module casing 7 and above the power port access opening 5J, to allow for manual remove by the fingers of the user, as illustrated in FIG. 15.

Specification of a Semi-Automated Method of Loading and Unloading a Rechargeable/Replaceable Battery Power Module Within the Battery Module Casing of the Telescopically-Extendable Handle and Battery Power Supplying Assembly Installed Within a Hard-Shell Luggage System of the Illustrative Embodiment of the Present Invention Having described the structure and relationships among the basic components comprising the luggage system 1 shown in FIG. 1, it is appropriate at this juncture to describe the various steps involved when using the semi-automated methods of the present invention, and how the various states of operation of the luggage system are advanced and sequenced while carrying out these methods.

Figure 5:
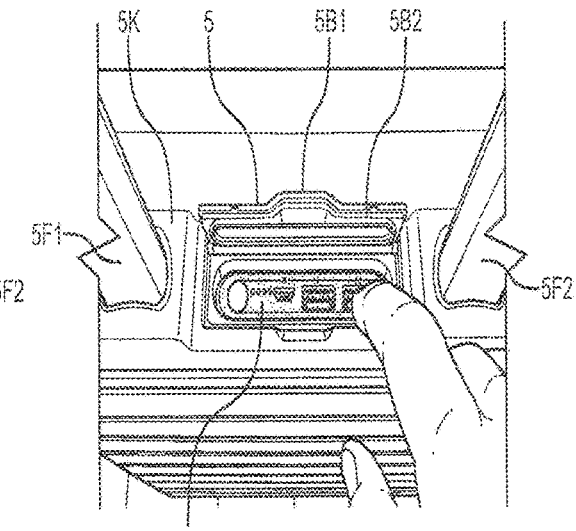
FIG. 5 is a partially cut-away perspective view of the hard-shell luggage system of FIG. 1, showing the rechargeable/replaceable battery power module being pushed downward within the battery module casing, so that the spring-biased support platform of the semi-automatic battery module ejection mechanism is allowed to approach its locked position, while the hinged power port cover panel is arranged in its open configuration.
Figure 6:
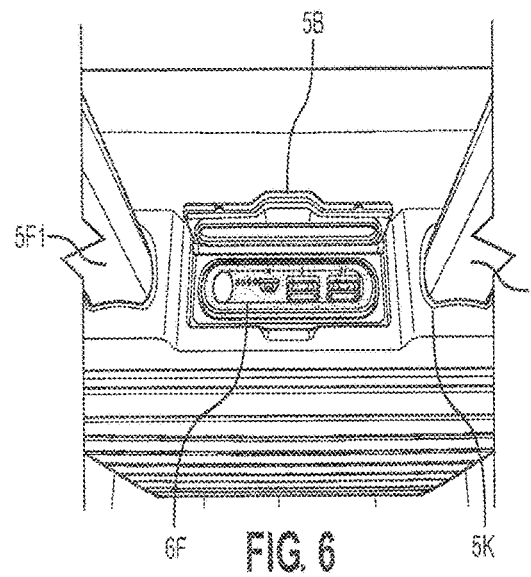
FIG. 6 is a partially cut-away perspective view of the hard-shell luggage system of FIG. 1, showing the rechargeable/replaceable battery power module pushed completely downward within the battery module casing, with the spring-biased support platform of the semi-automatic battery module ejection mechanism, having approached and reached its locked position, while the hinged power port cover panel is arranged in its open configuration, and the battery power module is now ready for use and supplying DC electrical power via USB power supplying cables.

FIG. 2 shows the front access port for the rechargeable/replaceable battery module 6, covered by its hinged battery power port cover panel 5B arranged in its closed configuration. The operation of FIG. 2 is shown from a cross-sectional point of view in corresponding FIG. 9. In this state of configuration, the soft rubber seals 5B2 on the hinged power port cover panel 5B shown in FIGS. 5 and 6 are arranged against the matched groove formed in the perimeter of the front surface 5K about the power port access opening 5J. This creates a watertight seal preventing water from entering the DC power ports 6A, 6B and 6C when the power port cover panel B is arranged in its closed configuration, as shown in FIGS. 2 and 9. This water-sealing feature should prevent damage to the battery power module 6 in the event the luggage piece is dropped in a pool of water, or exposed to rain, snow or extreme humidity, as the case may be.

FIG. 3 shows the battery module casing 7 empty without the rechargeable/replaceable battery module loaded therein, while the hinged battery cover panel 5B is arranged in its open configuration. The operation of FIG. 3 is shown from a cross-sectional point of view in corresponding FIG. 10.

Figure 4:
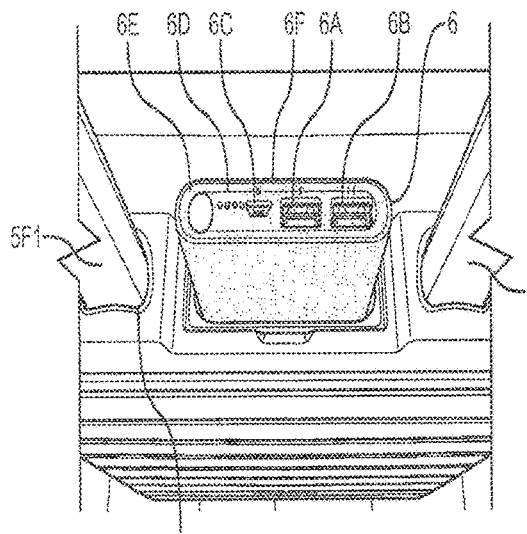
FIG. 4 is a partially cut-away perspective view of the hard-shell luggage system of FIG. 1, showing the rechargeable/replaceable battery power module being partially loaded within the battery module casing, and supported on the spring-biased support platform of the semi-automatic battery module ejection mechanism of the present invention, while the hinged battery port access cover panel is arranged in its open configuration.

FIG. 4 shows a rechargeable/replaceable battery module 6 that is half-way loaded within the battery module casing 7 and supported on the spring-biased support platform 8A of the pop-up battery ejector module 8, while the hinged battery cover panel 5B is arranged in its open configuration. The operation of FIG. 4 is shown from a cross-sectional point of view in corresponding FIG. 11.

FIG. 5 shows the rechargeable/replaceable battery module 6 being pushed downward within the battery module casing 7, so that the spring-biased support platform of the semi-automatic battery module ejection mechanism 8 approaches its locked position, while the hinged battery power port cover panel 5B is arranged in its open configuration. The operation of FIG. 5 is shown from a cross-sectional point of view in corresponding FIG. 12.

FIG. 6 shows the rechargeable/replaceable battery module 6 pushed completely downward within the battery module casing 7, with the spring-biased support platform 8A approaches being arranged in its locked position, while the hinged battery power port cover panel 5B is arranged in its open configuration, and the battery module ready for use and supplying DC electrical power via USB power supplying cables. The operation of FIG. 6 is shown from a cross-sectional point of view in corresponding FIG. 13.

Figure 7:
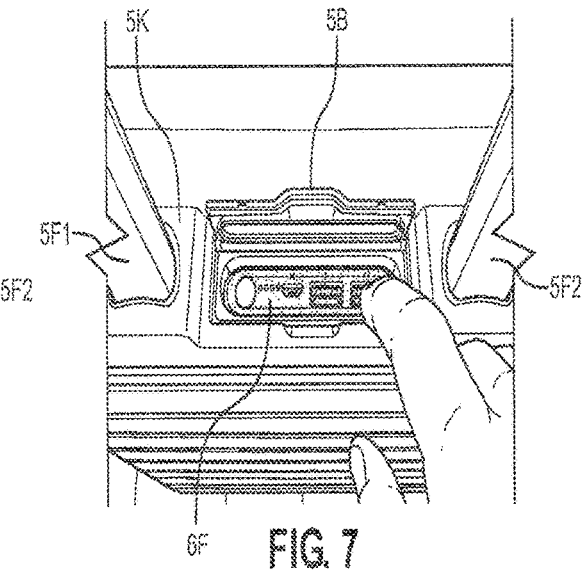
FIG. 7 is a partially cut-away perspective view of the hard-shell luggage system of FIG. 1, showing the rechargeable/replaceable battery module being pushed downwardly within the battery module casing, beneath the locked position of the spring-biased support platform, while the hinged power port cover panel is arranged in its open configuration, so as to initiate the semi-automatic power module ejection mechanism of the present invention, causing the battery power module to be automatically ejected from its battery module casing as shown in FIG. 8.

FIG. 7 shows the rechargeable/replaceable battery module 6 pushed downward within the battery module casing 7, beneath the locked position of the spring-biased support platform 8A, while the hinged battery power port cover panel 5B is arranged in its open configuration. The operation of FIG. 7 is shown from a cross-sectional point of view in corresponding FIG. 14.

Figure 8:
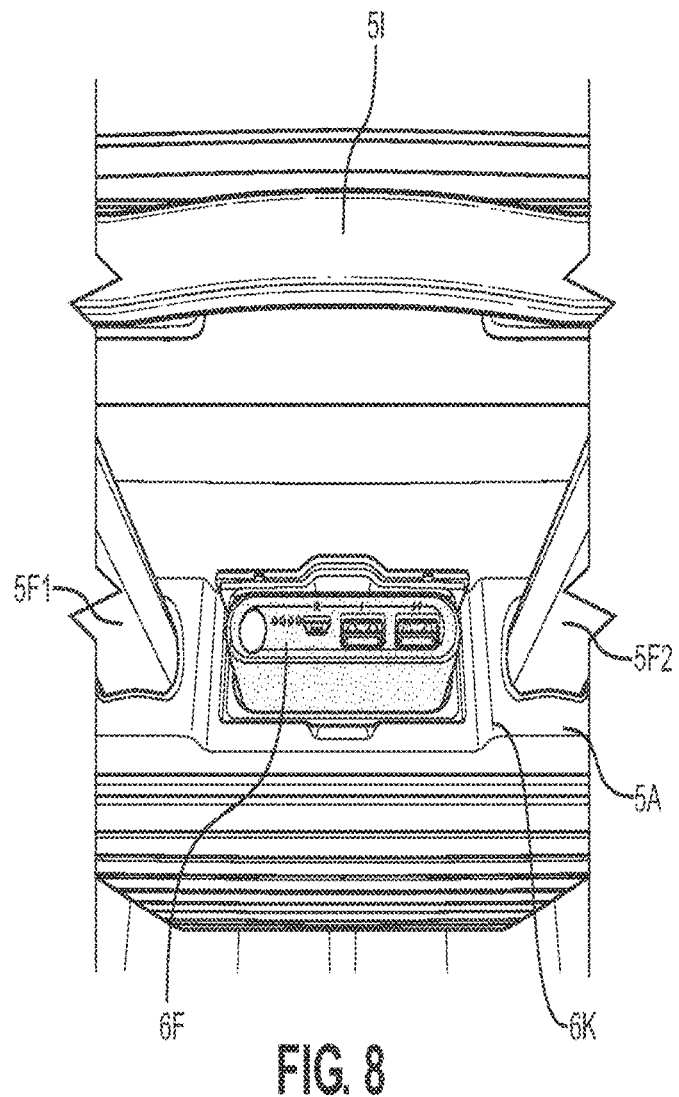
FIG. 8 is a partially cut-away perspective view of the hard-shell luggage system of FIG. 1, showing the rechargeable/replaceable battery module being pushed upward and out from the battery module casing, by the semi-automatic battery module ejection mechanism of the present invention, and ready for manual removal from the battery module casing using the fingers of the user, while the hinged power port cover panel is arranged in its open configuration.

FIG. 8 shows the rechargeable/replaceable battery module 6 pushed downward within the battery module casing 7, beneath the locked position of the spring-biased support platform 8A, while the hinged battery power port cover panel 5B is arranged in its open configuration. The operation of FIG. 8 is shown from a cross-sectional point of view in corresponding FIG. 15.

Specification of the Operation of the Semi-Automatic Battery Power Module Ejection Subsystem Employed in the Luggage System of the First Illustrative Embodiment of the Present Invention FIG. 9 reveals the base housing component 5A with its spring-biased power port cover panel 5B arranged in its closed configuration covering and closing the front rectangular access port 5J. During this state, the replaceable battery power module 6 removed from the cavity portion of the battery module casing 7, and the spring-powered battery module ejection mechanism 8 is ready for operation.

FIG. 10 reveals the base housing component 5A with its spring-biased power port cover panel 5B arranged in its open configuration providing the user access to the front rectangular power port access opening 5J. During this state, the battery module casing 7 is being prepared for loading a replaceable battery power module 6 therein.

FIG. 11 reveals the base housing component 5A with its spring-biased power port cover panel 5B arranged in its open configuration and a battery power module 6 is shown being loaded within the cavity of the battery module casing 7.

FIG. 12 reveals the base housing component 5A with its spring-biased power port cover panel 5B arranged in its open configuration, and the user pushing the battery module 6 into the base module casing 6 until the spring-powered battery module ejection mechanism 8 is arranged in its first state of configuration and operation, as described above.

FIG. 13 reveals the base housing component 5A with its spring-biased power port cover panel 5B arranged in its closed configuration, and the loaded battery power module 6 arranged in its first state of configuration maintained by the spring-powered battery module ejection mechanism 8, as described above.

FIG. 14 reveals the base housing component 5A with its spring-biased power port cover panel 5B rearranged in its open configuration, and the user pressing down on the top surface of the battery power module 6 so as to release and push out the battery power module 6 from its battery module casing 7 under the spring-power of the battery module ejection mechanism 8, as illustrated in FIG. 15, so that the user can manually remove the battery module 6 from the casing 7 with his or her fingers.

The above-described single-handed operations can be reversed to reload the battery power module 6 into the base module casing 7, as required or desired by the user to meet requirements of normal travel needs, as well as airline restrictions, product liability concerns, and/or heightened safety and security situations whenever and wherever they may arise.

Figure 17:
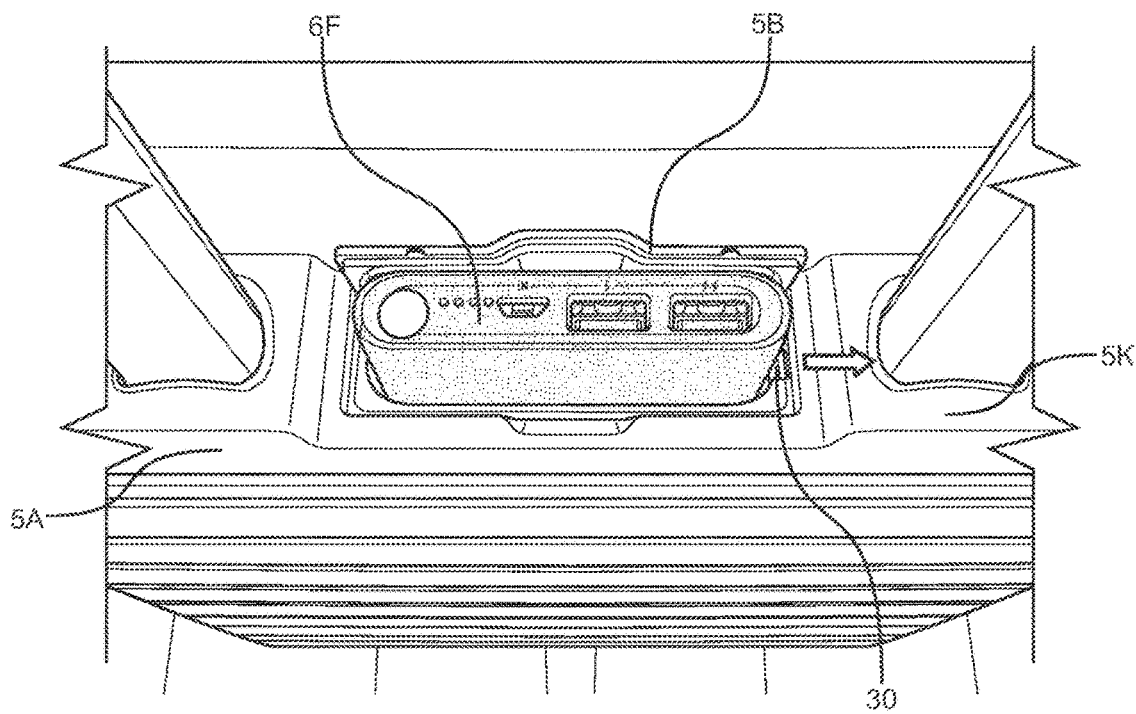
FIG. 17 is a perspective, partially cut-away and cross-sectional view of the telescopically-extendible handle and battery power supplying assembly of a second alternative embodiment of the present invention shown installed in the hard-shell luggage system of FIG. 1, corresponding to the luggage system and battery power module configuration shown in FIG. 11, revealing (i) the pair of telescopically-extended tubes shown projecting from the stationary tubes, (ii) the base housing component having its hinged power port cover panel arranged in its open configuration, with a battery power module being loaded through the front rectangular access port and half-way into the cavity of the battery module casing, and (iii) the spring-biased battery module locking latch mechanism of FIG. 16, mounted about the edge of the front rectangular access port of the battery module casing, being arranged in its un-locked configuration allowing the battery power module to slide out from its battery power casing for manual removal using the fingers of the user.
Figure 18:
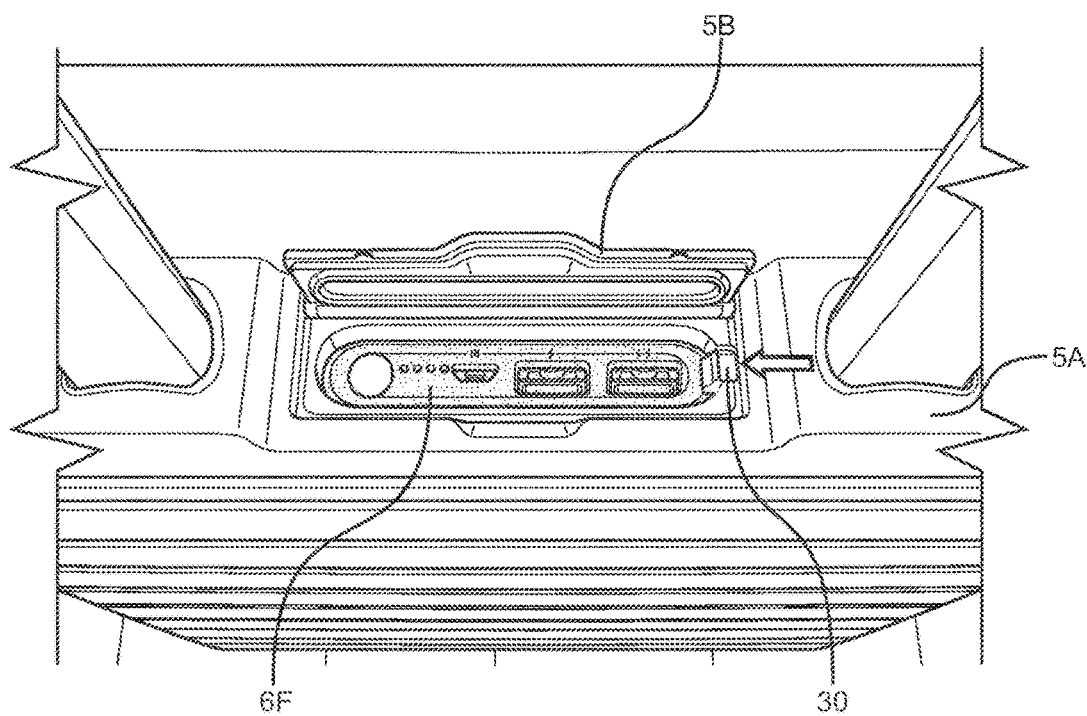
FIG. 18 is a perspective, partially cut-away and cross-sectional view of the telescopically-extendible handle and battery power supplying assembly of the second alternative embodiment of the present invention shown installed in the hard-shell luggage system of FIG. 1, corresponding to the luggage system and battery power module configuration shown in FIG. 12, revealing (i) the pair of telescopically-extended tubes shown projecting from the stationary tubes, (ii) the base housing component having a hinged power port cover panel arranged in its open configuration, with a battery power module being fully loaded through the front rectangular access port and completely into the cavity of the battery module casing, and (iii) the spring-biased battery module locking latch mechanism of FIGS. 16 and 17 mounted about the edge of the front rectangular access port of the battery module casing, being arranged in its locked configuration, corresponding to the state of configuration of the battery ejection mechanism 8 shown in FIG. 13, where the battery power module is safely retained within the battery module casing, and manually releasable using one finger to push the latch mechanism while using another finger to push down the battery power module beneath the semi-automatic battery module ejection mechanism in the battery module casing.

Specification of the Second Illustrative Embodiment of the Luggage System of the Present Invention FIGS. 16, 17 and 18 show a second alternative embodiment of the hard-shell luggage system of FIG. 1, employing a spring-biased battery module locking latch mechanism 30 mounted about the edge of the front rectangular power port access opening 5J.

As shown in FIG. 16, the user slides a replaceable battery power module 6 within the cavity portion of the battery module casing 7.

As shown in FIG. 17, the spring-biased battery module locking latch 30 is arranged in its un-locked configuration, allowing the battery power module 6 to slide into, and out from the battery power casing 7.

As shown in FIG. 18, once the battery power module 6 is fully loaded into the cavity of the batter module casing 7, the spring-biased battery module locking latch 30 automatically arranges into its locked configuration, corresponding to the state of configuration of the battery ejection mechanism 8 shown in FIG. 13, where the battery power module is safely retained within the battery module casing. In this open configuration, the spring-biased latch 30 retains the battery power module 6 within the battery module casing 7. To release the battery module 6 from the casing 7, the user simply uses one finger to manually release the spring-biased latch mechanism 30, while using another finger to push down on the battery power module 6, located beneath the semi-automatic battery module ejection mechanism 8, illustrated clearly in FIGS. 9 through 15. By virtue of using this battery latch mechanism 30, in combination with the semi-automatic battery module ejection mechanism 8, it is now possible to provide an additional battery locking measure to USB-power supplying luggage systems, and avoid the battery power module 6 from accidently popping or falling out of the battery module casing 7 when the hinged power port cover panel 5B is arranged in its open configuration, and the handle assembly is arranged in its protracted configuration. Variations and modification to this combination assembly will occur to those skilled in the art having the benefit of the present invention disclosure.

Figure 19A:
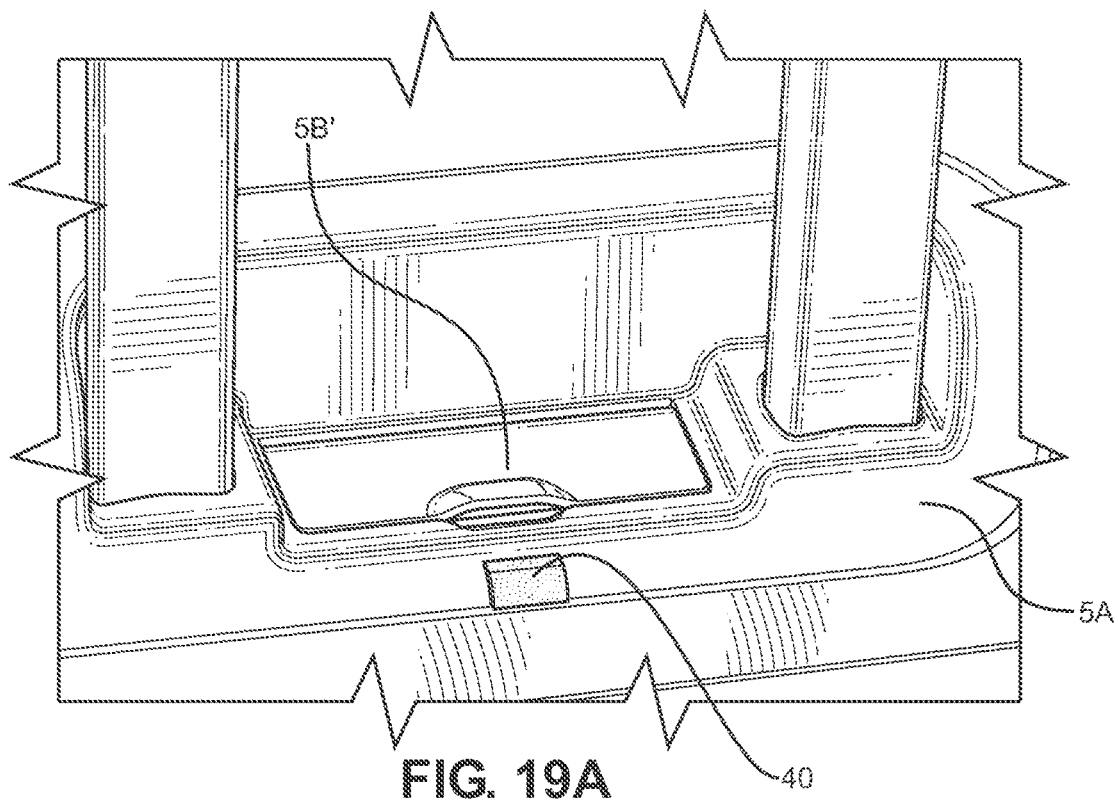
FIG. 19A is a perspective, partially cut-away and cross-sectional view of the telescopically-extendible handle and battery power supplying assembly of a third alternative embodiment of the present invention shown installed in the hard-shell luggage system of FIG. 1, revealing (i) the pair of telescopically-extended tubes shown projecting from the stationary tubes, (ii) the base housing component having a hinged power port cover panel with a central lip, arranged in its closed/locked configuration by way of a spring-biased latch, so as to retain a battery power module loaded within the cavity of the battery module casing, as illustrated in the workflow shown in FIGS. 3 through 6.
Figure 19B:
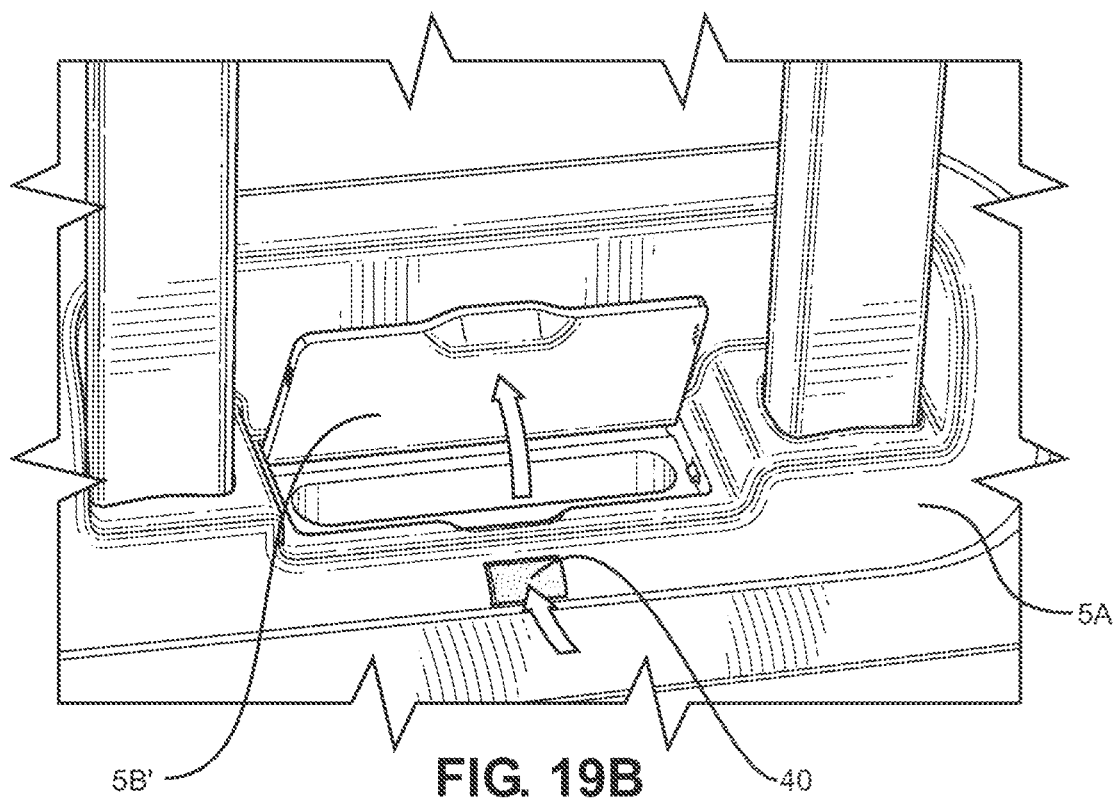
FIG. 19B is a perspective, partially cut-away and cross-sectional view of the telescopically-extendible handle and battery power supplying assembly of the third alternative embodiment of the present invention shown installed in the hard-shell luggage system of FIG. 1, revealing (i) the pair of telescopically-extended tubes shown projecting from the stationary tubes, and (ii) the base housing component having a hinged power port cover panel arranged in its open/unlocked configuration, achieved by manually depressing/releasing, with one's thumb, the spring-biased latch mounted on the base housing component, allowing a battery power module to be loaded within the battery module casing as illustrated in the workflow shown in FIGS. 3 through 6, or removed therefrom, as the case may be as illustrated in the workflow shown in FIGS. 7 and 8, using single-handed battery module handling operations.

Specification of the Third Illustrative Embodiment of the Luggage System of the Present Invention FIGS. 19A and 19B show a third alternative embodiment of the hard-shell luggage system of FIG. 1, employing a spring-biased battery module locking latch mechanism 40 mounted to the front edge of the power port cover panel 5B'. In this embodiment, the hinged power port cover panel 5B' has a lip portion 5B1' that can be lifted up using the user's finger, while her thumb is used to push up on the spring-biased latch 40 in the direction illustrated by the arrow in FIG. 19B.

As shown in FIG. 19A, the hinged power port cover panel 5B1 is arranged in its closed/locked configuration by way of a spring-biased latch 40, so as to retain a battery power module 6 loaded within the cavity of the battery module casing 7.

As shown in FIG. 19B, the hinged power port cover panel 5B' is arranged in its open/unlocked configuration, achieved by manually depressing/releasing the latch 40 with one's thumb while lifting up on the lip portion 5B1' of the power port cover panel 5B'. In this open configuration, a battery power module 6 can be loaded within the battery module casing 7, or removed therefrom, as the case may be, using single-handle battery module handling operations, as illustrated in FIGS. 2 through 16.

Figure 20A:
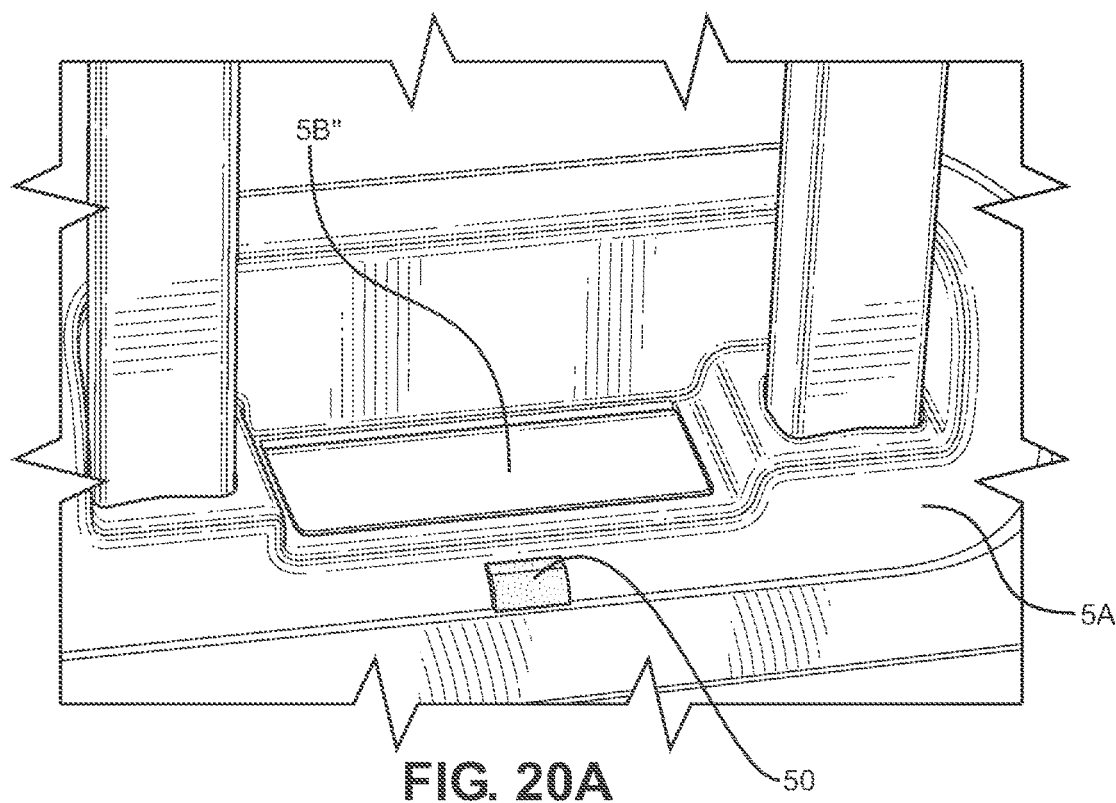
FIG. 20A is a perspective, partially cut-away and cross-sectional view of the telescopically-extendible handle and battery power supplying assembly of a fourth alternative embodiment of the present invention shown installed in the hard-shell luggage system of FIG. 1, revealing (i) the pair of telescopically-extended tubes shown projecting from the stationary tubes, and (ii) the base housing component having a hinged substantially-planar power port cover panel arranged in its closed/locked configuration, by a spring-biased latch, so as to retain a battery power module loaded within the cavity of the battery module casing.
Figure 20B:
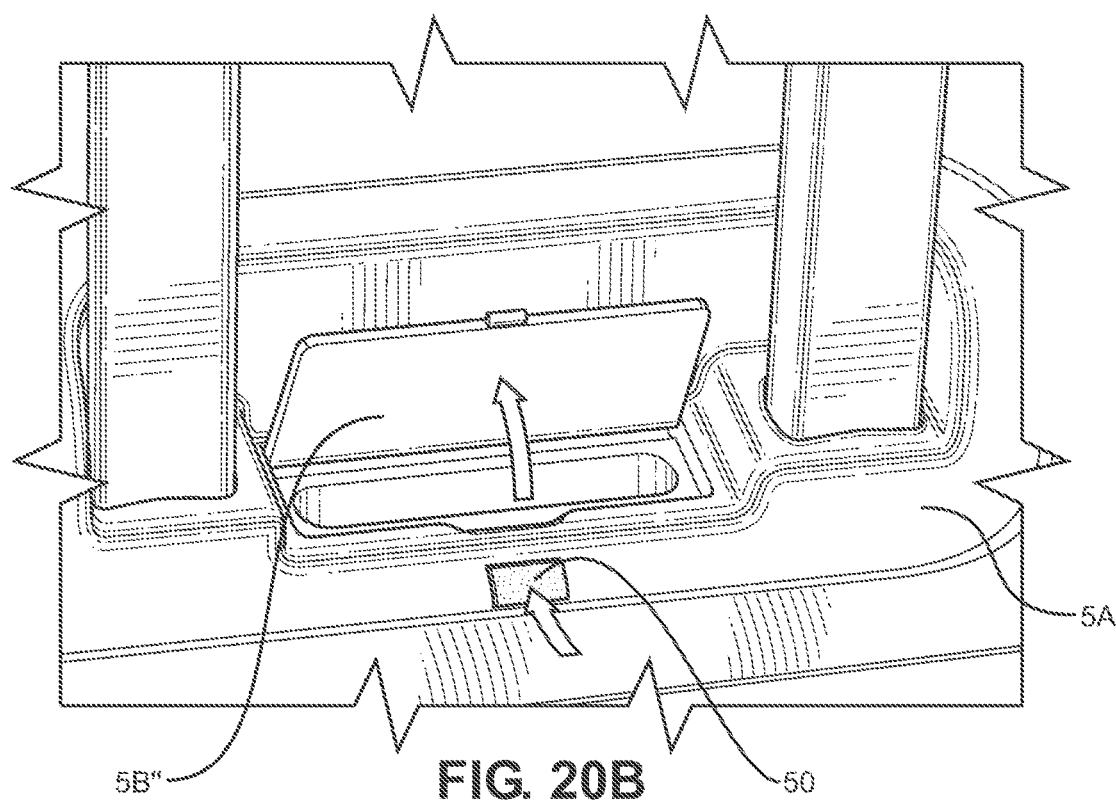
FIG. 20B is a perspective, partially cut-away and cross-sectional view of the telescopically-extendible handle and battery power supplying assembly of the fourth alternative embodiment of the present invention shown installed in the hard-shell luggage system of FIG. 1, revealing (i) the pair of telescopically-extended tubes shown projecting from the stationary tubes, and (ii) the base housing component having a hinged substantially-planar power port cover panel arranged in its open/unlocked configuration, achieved by manually depressing, with one's thumb, the release latch mounted on the base housing component, allowing a battery power module to be loaded within the battery module casing as illustrated in the workflow shown in FIGS. 3 through 6, or removed therefrom, as the case may be as illustrated in the workflow shown in FIGS. 7 and 8, using single-handed battery module handling operations.

Specification of the Fourth Illustrative Embodiment of the Luggage System of the Present Invention FIGS. 20A and 20B show a fourth alternative embodiment of the hard-shell luggage system of FIG. 1, employing a spring-biased battery module locking latch mechanism 50 mounted to the front edge of the power port cover panel 5B". In this embodiment, the hinged power port cover panel 5B' is substantially planar and has no lip portion, as shown in the third illustrative embodiment.

As shown in FIG. 20A, the hinged power port cover panel 5B1" is arranged in its closed/locked configuration by way of a spring-biased latch 50, so as to retain a battery power module 6 loaded within the cavity of the battery module casing 7.

As shown in FIG. 20B, the hinged power port cover panel 5B" is arranged in its open/unlocked configuration, achieved by manually depressing/releasing the latch 50 with one's thumb in the direction of the arrow, causing the panel to pop-open in a spring-loaded manner in a normally-biased open configuration. In this open configuration, a battery power module 6 can be loaded within the battery module casing 7, or removed therefrom, as the case may be, using single-handle battery module handling operations.

Figure 21A:
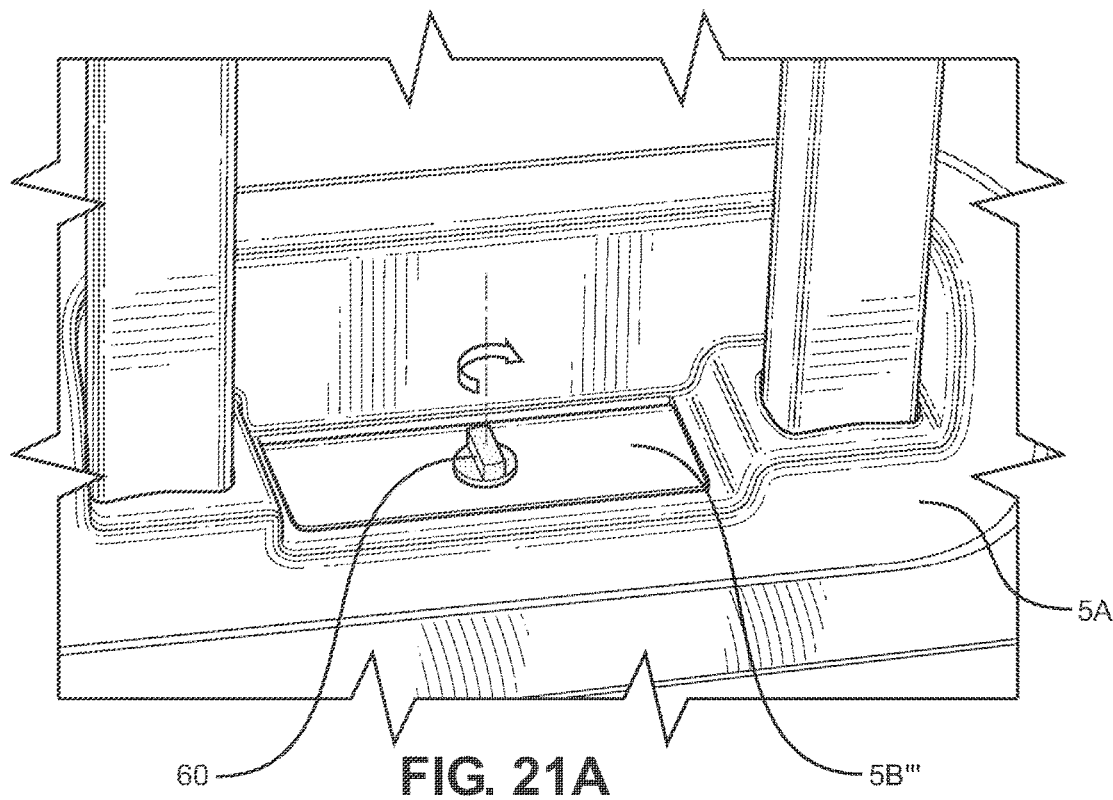
FIG. 21A is a perspective, partially cut-away and cross-sectional view of the telescopically-extendible handle and battery power supplying assembly of a fifth alternative embodiment of the present invention shown installed in the hard-shell luggage system of FIG. 1, revealing (i) the pair of telescopically-extended tubes shown projecting from the stationary tubes, (ii) the base housing component having a hinged power port cover panel arranged in its closed/locked configuration, to retain a battery power module loaded within the cavity of the battery module casing, as illustrated in the workflow shown in FIGS. 3 through 6, by manually rotating/locking the cover panel into position using single-handled battery module handling operations, as illustrated in the workflow shown in FIGS. 3 through 6.

Specification of the Fifth Illustrative Embodiment of the Luggage System of the Present Invention FIG. 21A shows a fifth alternative embodiment of the hard-shell luggage system of FIG. 1, employing a rotary-type battery module locking latch mechanism 60 mounted in the central portion of the power port cover panel 5B". In this embodiment, the hinged power port cover panel 5B" is substantially planar and has no lip portion, as shown in the third illustrative embodiment.

As shown in FIG. 21A, the hinged power port cover panel 5B1" is arranged in its closed/locked configuration by way of a rotary latch 60, so as to retain a battery power module 6 loaded within the cavity of the battery module casing 7.

Figure 21B:
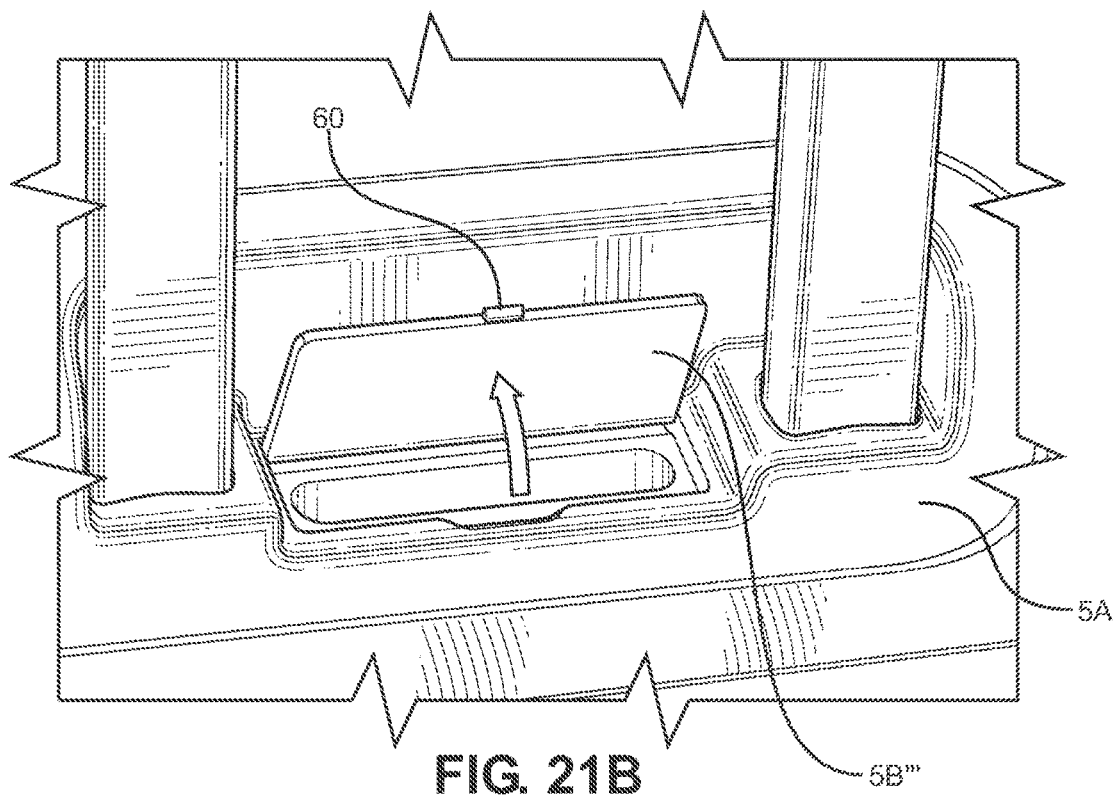
FIG. 21B is a perspective, partially cut-away and cross-sectional view of the telescopically-extendible handle and battery power supplying assembly of the fifth alternative embodiment of the present invention shown installed in the hard-shell luggage system of FIG. 1, revealing (i) the pair of telescopically-extended tubes shown projecting from the stationary tubes, and (ii) the base housing component having a hinged power port cover panel arranged in its open/unlocked configuration, achieved by rotating and unlocking the latch mounted on the hinged power port cover panel component, allowing a battery power module to be loaded within the battery module casing, or removed therefrom, as the case may be, using single-handed battery module handling operations, as illustrated in the workflow shown in FIGS. 3 through 6.

As shown in FIG. 21B, the hinged power port cover panel 5B" is arranged in its open/unlocked configuration, achieved by manually rotating the latch knob 60 with one's thumb in the direction of the arrow, causing the panel unlock from the base housing component, and pop-open in a spring-loaded manner in a normally-biased open configuration. In this open configuration, a battery power module 6 can be loaded within the battery module casing 7, or removed therefrom, as the case may be, using single-handle battery module handling operations.

Figure 22:
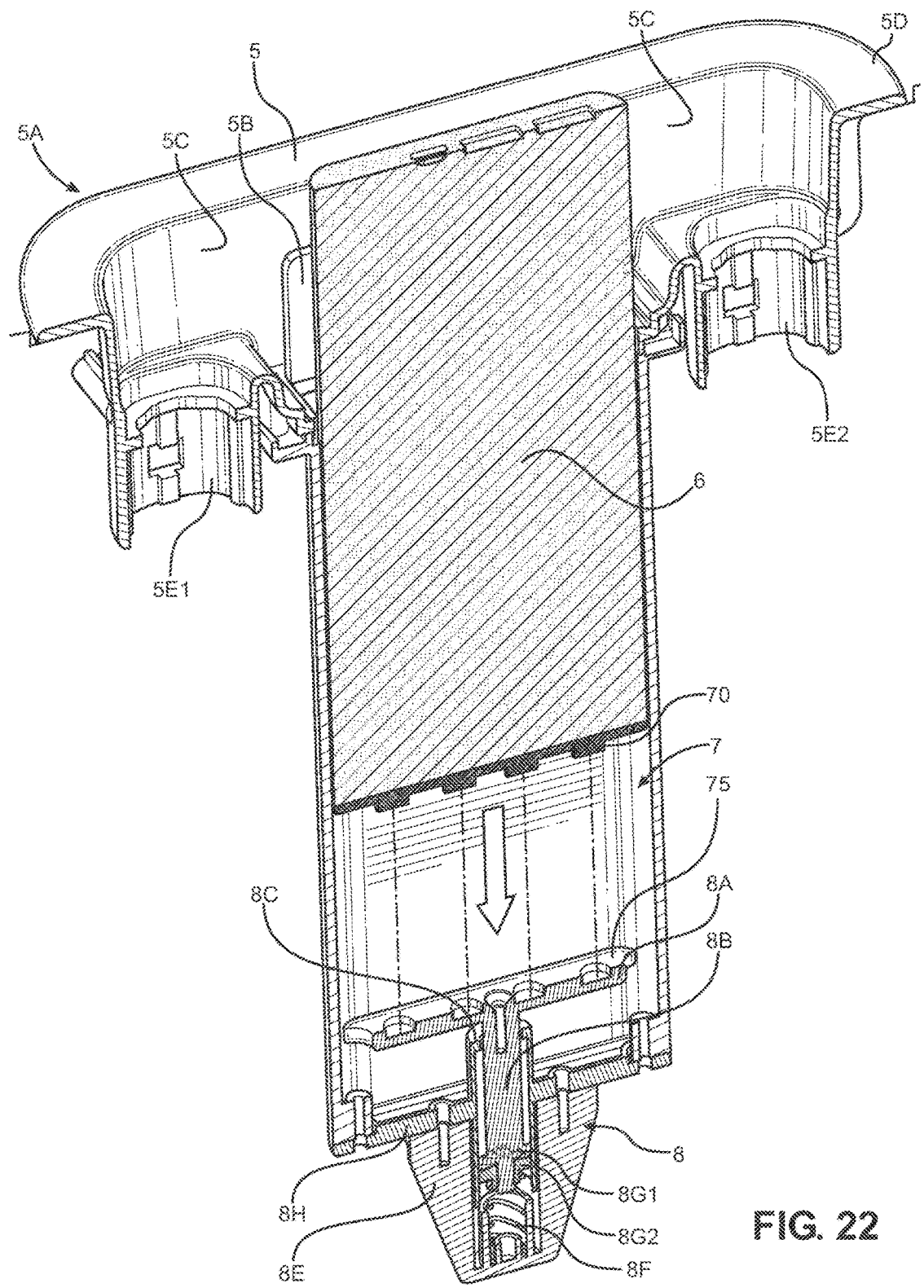
FIG. 22 is a perspective, partially cut-away and cross-sectional view of the telescopic handle and power supply assembly of a sixth alternative embodiment of the present invention shown installed in the hard-shell luggage system of FIG. 1, revealing (i) the base housing component having its hinged power port cover panel arranged in its open configuration, with a battery power module being loaded through the front rectangular access port and half-way into the cavity of the batter module casing, (ii) a resilient rubber pronged-like battery retention bumper mounted at the bottom end of the battery module casing, and (iii) a mated or grooved prong-retaining plate mounted on the battery support platform located at the bottom of the battery power casing, so that the pronged rubber bumper is releasably retained within the mated grooved prong-retainer plate when the battery power module is loaded within the battery module casing, as illustrated in the workflow shown in FIGS. 3 through 6, preventing the battery power module from sliding out of the battery module casing under normal and expected tips and falls of the luggage system, and during normal DC powering and recharging operations.

Specification of the Sixth Illustrative Embodiment of the Luggage System of the Present Invention FIG. 22 shows a sixth alternative embodiment of the present invention shown installed in the hard-shell luggage system of FIG. 1. FIG. 22 reveals the use of a rubber resilient pronged-like battery retention and mounting bumper 70 mounted at the bottom end of the battery module 7, and a mated grooved prong-retaining plate 75 mounted on the ejector platform 8A in the bottom of the battery module casing 7. With this arrangement, the pronged rubber bumper 70 is releasably retained within the mated grooved prong-retainer plate 75 when the battery power module 6 is loaded within the battery module casing 7. This releasable battery retention mechanism (70, 75) prevents the battery power module 6 from sliding out of the casing 7 under normal and expected tips and falls of the luggage system, and/or use of the battery power module 6 during normal DC powering and recharging operations.

In the preferred embodiment, the battery power module 6 is contained or housed in battery module casing 7. At any instant in time, however, airport safety regulations will likely impact particular design choices on whether or not battery storage devices are permitted within check-in type luggage systems, as well as carry-on type luggage systems.

Methods of Operating the Luggage Systems of the Present Invention Using Single-Handed Operations The luggage systems described above are provided new and improved battery power modules, and advanced storage, retention and release mechanisms. These technological improvements, in turn, support new methods of operating these luggage pieces using single-handed operations. Such methods include, but are not limited to, methods of loading and unloading rechargeable battery power modules in such luggage pieces, and methods of accessing and using of battery power modules in such luggage pieces while traveling.

Each of these improved methods provide simpler and more effective ways of retaining such battery power modules within the base module casings beneath the telescopically-extendible handle and battery power supplying assembly 5 of the luggage pieces, with the added benefit of freeing up the other hand of the user while traveling through diverse and challenging environments including, for example, airports, terminals, staircases, roadways, sidewalks, hallways, bye-ways, as well as on airplanes, trains, buses, taxis, and other modes of transportation around the world.

One method involves operating a luggage piece, such as shown in FIGS. 1 through 15, using only single-handed operations. According to this method, the fingers of the user's hand are used to perform the following operations: (i) manually release and protract the telescopically-extendible handle 5I from its base housing component 5 installed in the luggage piece; (ii) slide or rotate its release latch/lock (30, 40, 50, 60) to unlock the hinged power port cover panel 5B covering the USB power recharging and discharging ports 6A, 6B and 6C of a battery power module 6 loaded and retained in the battery module casing mounted beneath the telescopically-extendible handle 5I; (iii) rotate upwardly the hinged power port cover panel 5B to its open configuration, (iv) plug a USB power cable into the USB power recharging port or USB power discharging/supplying port of the battery power module 6, as the case may be; and (v) rotate the hinged power port cover panel 5B in a downwardly direction.

Another method involves loading a rechargeable battery power module 6 in a luggage piece, as shown in FIGS. 1 through 15, using only single-handed operations. According to this method, the fingers of the user's hand are used to perform the following operations: (i) manually release and protract the telescopically-extendible handle 5I from its base housing component 5 installed in the luggage piece; (ii) slide or rotate its release latch/lock (30, 40, 50, 60) to unlock the hinged power port cover panel 5B covering the battery module casing 7 mounted beneath the telescopically-extendible handle 5I; (iii) rotate upwardly the hinged power port cover panel 5B to its open configuration; (iv) load a rechargeable a battery power module 6 into the battery module casing 7, and then press downwardly on the rechargeable battery power module 6 retained the battery module casing 7, until the battery power module automatically locks into position within the battery module casing 7 beneath the access opening surface 5J; (v) rotate the hinged power port cover panel 5B in a downwardly direction to close off the battery module casing 7 from the environment; and finally (vi) manually release and retract the telescopically-extendible handle 5I into the base housing component 5 mounted in the luggage piece 1.

Another method involves removing a rechargeable battery module from a luggage piece, as shown in FIGS. 1 through 15, using only single-handed operations. According to this method, the fingers of the user's hand are used to perform the following operations: (i) manually release and protract the telescopically-extendible handle 5I from its base housing component 5 installed in the luggage piece; (ii) slide or rotate its release latch/lock (30, 40, 50 or 60) to unlock the hinged power port cover panel 5B covering the USB power recharging and discharging ports of a battery power module 6 loaded and retained in the battery module casing 7 mounted beneath the telescopically-extendible handle 5I; (iii) rotate upwardly the hinged power port cover panel 5B to its open configuration; (iv) press downwardly the rechargeable battery power module 6 retained the battery module casing 7, and allow the battery power module to semi-automatically pop-up and extending beyond the battery module casing opening 5J for easily removable using the fingers of the user; (v) rotate the hinged power port cover panel 5B in a downwardly direction to close off the battery module casing 7 from the environment; and finally (vi) manually release and retract the telescopically-extendible handle 5I into the base housing component 5 mounted in the luggage piece 1.

Another method involves retaining a rechargeable battery power module 6 in a luggage piece, as shown in FIGS. 1 through 15, using only single-handed operations. According to this method, the fingers of the user's hand are used to perform the following operations: (i) manually release and protract the telescopically-extendible handle assembly 5I from its base housing component installed in the luggage piece; (ii) slide or rotate its release latch/lock to unlock the latch (30, 40, 50 or 60) on the hinged power port cover panel 5B covering the battery module casing 7 mounted beneath the telescopically-extendible handle assembly; (iii) rotate upwardly the hinged power port cover panel 5B; (iv) load a rechargeable a battery power module 6 having elastic retention projections 70 mounted on the bottom of the battery power module 6, into the battery module casing having a support platform 8A with mated retention recesses 75 that releasably receive the elastic retention projections 70 and retain the battery power module 6 within the battery module casing 7, and then press downwardly on the rechargeable battery power module 6 retained the battery module casing 7 until the battery power module automatically snap-fit locks into position within the battery module casing beneath the access opening surface; (v) rotate the hinged power port cover panel 5B in a downwardly direction to close off the battery module casing from the environment; and finally (vi) manually release and retract the telescopically-extendible handle 5I into the base housing component 5 mounted in the luggage piece 1.

Modifications of the Illustrative Embodiments of the Present Invention

The present invention has been described in great detail with reference to the above illustrative embodiments. It is understood, however, that numerous modifications will readily occur to those with ordinary skill in the art having had the benefit of reading the present invention disclosure.

While the battery module ejection mechanism 8 is mounted at the open bottom end portion of the battery module casing, in the illustrative embodiment, it is possible to integrate such a modified spring-biased mechanism 8' to the bottom of the battery power module 6 itself, with proper modifications, to allow similar functions supported by finger-pressing operations illustrated in FIGS. 9 through 15. Such modifications could involve having projections extending from the mechanism 8' passing through apertures formed in the battery module casing 7, to enable similar functions supported in the first illustrative embodiment of the present invention described above.

For example, the luggage system of the present invention can be modified so that the telescopic handle and rechargeable power supply module 6 is adapted to provide one or more additional USB power supply ports mounted within the interior volume of the front hard-shell housing portion 3A.

While the luggage system has been described as a "carry-on" type piece of luggage piece, and luggage systems have been described as "carry-on/check-in" luggage pieces, it is understood that the any of these luggage systems can be used in either carry-on, check-in and/or carry-on/check-in applications and that how any such system of the present invention may be used by a user will depend on various factors including prevailing governmental regulations operating in the airline, ocean-liner, railway and other travel-related industries.

These and all other such modifications and variations are deemed to be within the scope and spirit of the present invention as defined by the accompanying Claims to Invention.

What is claimed:

1. A luggage system comprising:
    front and rear housing portions hinged together to provide a housing assembly provided with a set of spinner wheels; and
    a telescopically-extendable handle and rechargeable power supply assembly mounted within the rear housing portion and having a pair of spaced-apart guide tubes mounted in the rear housing portion, and supporting a pair of telescopically-extendable rods joined to a handle structure, for pulling the luggage system on the set of the spinner wheels;

wherein the telescopically-extendable handle and rechargeable power supply assembly includes
(i) a base housing component mounted in an aperture formed in the rear housing portion, and having a top surface with a power port access opening;
(ii) a battery module casing mounted to and beneath the base housing component, and disposed substantially in the same plane as and between the pair of spaced-apart guide tubes; and
(iii) a semi-automatic battery power module ejection mechanism comprising a spring-biased platform mounted at the bottom of the battery module casing, for ejecting a battery power module from the battery module casing when the finger of a user presses down on the battery power module while retained in the battery module casing so that the battery power module automatically pops up above the surface of the power port access opening, for manual removal of the battery power module from the battery module casing, wherein the spring-biased platform has multiple configurable states including:
a first lockable state where the spring-biased platform is located at a first position in the battery module casing and supports the battery power module in the battery module casing at a first depth within the battery power module where the top of the battery power module resides at or below the surface of the power port access openings; and
a second lockable state where the spring-biased platform is located at a second position in a second depth within the battery power module where the top of the battery power module resides above the surface of the power port access opening so as to allow the battery power module to be manually removed and withdrawn from the battery module casing using the fingers of the user.

2. The luggage system of claim 1, which further comprises:
a power port cover panel hinged to the base housing component and having a closed configuration and an open configuration,
wherein the power port cover panel conceals one or more power supplying or recharging ports when the power port cover panel is arranged in the closed configuration, and
wherein the power port cover panel reveals the one or more power supplying or recharging ports when the power port cover panel is arranged in the open configuration.

3. The luggage system of claim 1 further comprising a rechargeable DC battery power module configured to be removable from the battery module casing.

4. The luggage system of claim 2, wherein the power port cover panel comprises rubber seals on its underside to create a water-proof seal when the power port cover panel is arranged in the closed configuration.

5. The luggage system of claim 1, which is a hard-shell luggage system,
wherein the front housing portion is realized as a front hard-shell housing portion;
wherein the rear housing portion is realized as a rear hard-shell housing portion;
wherein the front and rear hard-shell housing portions are hinged together to provide a hard-shell housing assembly; and
wherein the telescopically-extendable handle and rechargeable power supply assembly is mounted in the rear hard-shell housing portion.

6. The luggage system of claim 5 wherein the front and rear hard-shell housing portions are sealed using a zipper subsystem.

7. The luggage system of claim 1, wherein the set of spinner wheels comprises first and second pairs of spinner wheels, wherein the first pair of spinner wheels are mounted on the bottom of the rear housing portion, and wherein the second pair of spinner wheels are mounted on the bottom of the front housing portion.

8. The luggage system of claim 3, wherein the battery module casing is releasably fastened to the base housing component to permit the rechargeable DC battery power module to be replaced as required.

9. The luggage system of claim 1, further comprising a rechargeable DC battery power module loaded through the power port access opening, contained in the battery module casing, and providing a DC battery recharging port and a set of DC power supplying ports, and the DC battery recharging port and the set of DC power supplying ports being directly accessible through the power port access opening provided in the top surface of the base housing component.

10. The luggage system of claim 2 wherein at least one of the one or more power supplying or recharging ports is realized as a micro-USB-type rechargeable DC battery recharging port.

11. The luggage system of claim 2 wherein at least one of the one or more power supplying or recharging ports is realized as a USB-type DC power supplying port.

12. The luggage system of claim 10 wherein the micro-USB-type rechargeable DC battery recharging port is adapted to receive DC electrical power by way of a flexible DC power cord.

13. The luggage system of claim 11 wherein the USB-type DC power supplying port is adapted to receive the USB plugs of electrically-powered devices and supply electrical DC power to the electrically-powered devices in a voltage regulated manner.

14. The luggage system of claim 2, wherein the one or more power supplying or recharging ports comprise a DC battery recharging port realized as a micro-USB-type rechargeable DC battery recharging port and a DC power supplying ports realized as USB-type DC power supplying port.

15. The luggage system of claim 14, wherein the micro-USB-type DC power recharging port and the USB-type DC power supplying ports are recessed within the base housing component so that when the power port cover panel is arranged in its closed configuration, water is prevented from entering the USB-type DC power recharging and supplying ports.

16. The luggage system of claim 14, wherein the power port cover panel is biased to automatically close down upon USB-type DC power plug connectors inserted into the USB-type DC power supplying port during charging operations, and reduce exposure of the USB-type DC supplying ports to natural elements.

* * * * *